United States Patent [19]
Kaneda

[11] Patent Number: 6,115,552
[45] Date of Patent: Sep. 5, 2000

[54] LENS DEVICE AND OPTICAL APPARATUS

[75] Inventor: Naoya Kaneda, Chigasaki, Japan

[73] Assignee: Canon Kabushiki Kaisha, Tokyo, Japan

[21] Appl. No.: 09/097,000

[22] Filed: Jun. 13, 1998

[30] Foreign Application Priority Data

Jun. 16, 1997 [JP] Japan .................................. 9-158761

[51] Int. Cl.[7] .................................................. G03B 17/00
[52] U.S. Cl. .................................................. 396/82; 396/87
[58] Field of Search ................................ 396/72, 76–79, 396/81, 82, 87, 101

[56] References Cited

U.S. PATENT DOCUMENTS

| | | | |
|---|---|---|---|
| 4,920,369 | 4/1990 | Kaneda et al. | 396/81 |
| 4,950,054 | 8/1990 | Wada et al. | 396/85 |
| 5,060,001 | 10/1991 | Kaneda | 396/81 |
| 5,189,559 | 2/1993 | Kaneko | 396/86 |
| 5,315,340 | 5/1994 | Hirasawa | 396/81 |
| 5,406,345 | 4/1995 | Hirasawa | 396/86 |
| 5,436,684 | 7/1995 | Hirasawa | 396/79 |
| 5,455,649 | 10/1995 | Yamada et al. | 396/87 |
| 5,781,808 | 7/1998 | Sasaki | 396/81 |
| 5,798,793 | 8/1998 | Tanaka | 396/89 |
| 5,842,059 | 11/1998 | Suda | 396/101 |
| 5,890,020 | 3/1999 | Hirasawa | 396/77 |

*Primary Examiner*—Russell Adams
*Attorney, Agent, or Firm*—Robin, Blecker & Daley

[57] ABSTRACT

A lens device comprises an optical system including a first lens which performs a magnification varying operation, and a second lens which is positioned rearwardly of the first lens along an optical axis and performs a focus adjusting operation, a first detecting circuit for detecting a position of the first lens and a position of the second lens, and a storage circuit which stores a positional relation between the first lens and the second lens under reference conditions, wherein a position detection by the first detecting circuit is corrected by use of deviation information if the position of the first lens and the position of the second lens detected by the first detecting circuit deviate from the positional relation stored in the storage circuit, when an in-focus state of the second lens is detected.

36 Claims, 26 Drawing Sheets

F I G. 25
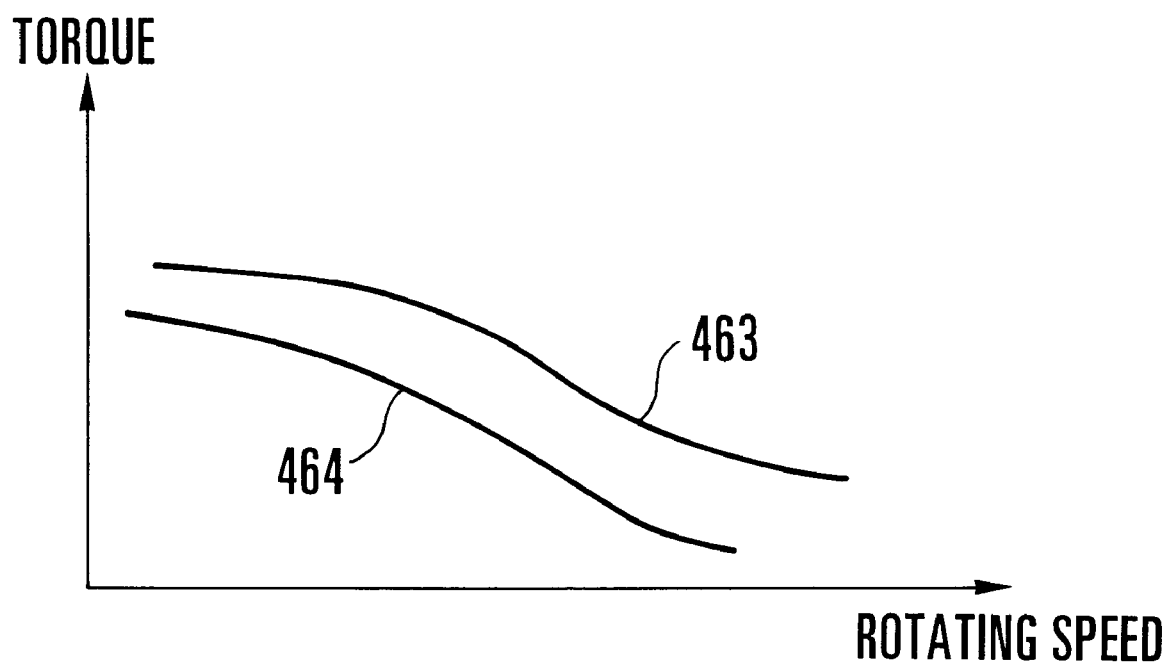

LENS DEVICE AND OPTICAL APPARATUS

BACKGROUND OF THE INVENTION

1. Field of the Invention

The present invention relates to a lens device for use in an optical apparatus such as a silver-halide camera, a video camera and a television camera, as well as to such optical apparatus.

2. Description of Related Art

In the recent trend toward further reductions in the sizes and weights of cameras such as home video cameras and photographic cameras for 35-mm film, such a camera has employed a so-called rear focus type of zoom lens as a photographing zoom lens. The rear focus type of zoom lens is characterized by the capability to readily realize a predetermined magnification variation ratio, a wide angle of view, a short overall lens length, a front lens of small diameter, and an entire lens system of small size and light weight, and is arranged to effect focusing by using a lens located on an image-plane side rather than by using a variator part. In the rear focus type of zoom lens, even in the case of the same subject, since the position of its focusing lens in the direction of its optical axis varies with the magnification varying operation of the variator part, it is necessary to adjust the position of the focusing lens in association with the magnification varying operation. To this end, various lens barrels having a mechanism for adjusting the position of a focusing lens have heretofore been proposed.

FIG. 11 is a diagrammatic cross-sectional view of the essential portion of a zoom lens barrel using a conventional rear focus type of zoom lens. The zoom lens shown in FIG. 11 includes a front lens group (a first group) 111 which is fixed, a variator lens group (a second group or variator lens) 112 which moves along the optical axis of the zoom lens to perform a magnification varying operation, a lens group (a third group) 113 which is fixed, and a lens group (a fourth group or focusing lens) 114 which moves along the optical axis for the purpose of correcting a variation in an image plane due to a magnification varying operation and effecting focusing.

The zoom lens barrel shown in FIG. 11 includes a guide rod 133 for stopping the rotation of the second group 112, a variator transporting rod 134 for moving the second group 112, a fixed tube 135, an iris unit 136 (which is inserted at right angles with the sheet surface of FIG. 11, and a focusing motor 137 such as a stepping motor. The stepping motor 137 has an output shaft 138 part of which has an externally threaded portion 138a for moving the fourth group 114. An internally threaded portion 139 is meshed with the externally threaded portion 138a and is formed integrally with a moving frame 140 of the fourth group 114. The zoom lens barrel shown in FIG. 11 also includes guide rods 141 and 142 for the moving frame 140 of the fourth group 114, a back plate 143 for positioning and pressing the guide rods 141 and 142, a relay holder 144 which holds the third group 113, a zooming motor 145, a speed reducing unit 146 for the zooming motor 145, and interlocking gears 147 and 148, the interlocking gear 148 being fixed to the variator transporting rod 134 for effecting zooming.

In the above-described arrangement, if the stepping motor 137 is activated, the fourth group 114 for focusing is moved along the optical axis by the externally threaded portion 138a formed around the output shaft 138. If the zooming motor 145 is activated, the gears 147 and 148 are interlockingly driven to rotate the variator transporting rod 134, thereby moving the second group 112 along the optical axis.

FIG. 2 is a graph showing locus data plotted against several subject distances, the locus data indicating the positional relation between the second group (variator lens) 112 and the focusing fourth group 114 with respect to the optical axis in the above-described zoom lens. In FIG. 2, there are shown in-focus positional relations against subject distances of infinity (∞), 2 m, 1 m, 80 cm and 0 cm by way of example. In the rear focus type of zoom lens, since the positional relation between the variator lens 112 and the focusing lens 114 differs for different subject distances as shown in FIG. 2, it is impossible to interlock the individual lens groups with each other by means of a simple mechanical structure such as a cam ring of a front focus type of zoom lens.

Accordingly, if the zooming motor 145 is simply driven in the structure shown in FIG. 11, a variation in the image plane occurs due to a magnification varying operation.

To cope with this problem, it has heretofore been proposed to provide various methods of optimally controlling the positional relation between the variator lens 112 and the focusing lens 114 such as that shown in FIG. 2, according to different subject distances.

For example, Japanese Laid-Open Patent Application No. Hei 1-280709 (corresponding to U.S. Pat. No. 4,920,369) and Japanese Laid-Open Patent Application No. Hei 1-321416 have proposed a method of tracing loci of the positional relation between a focusing lens and a variator lens with respect to an optical axis according to different subject distances.

FIGS. 12 and 13 are explanatory views of a method of maintaining the positional relation between a variator lens and a focusing lens with respect to an optical axis, which method is proposed in Japanese Laid-Open Patent Application No. Hei 1-280709.

The block diagram of FIG. 12 will be described below. The lens groups 111 to 114 are identical to those shown in FIG. 11. The position of the variator lens 112 with respect to the optical axis is detected by a zoom encoder 149. The zoom encoder 149 may be, for example, a volume encoder which is arranged so that a brush integrally secured to a variator moving ring slides a circuit board on which a resistance pattern is printed. An iris encoder 150 is provided for detecting an aperture value by using the output from a Hall element 163 provided in, for example, an iris meter. Reference numeral 151 denotes an image pickup element such as a CCD, and reference numeral 152 denotes a camera processing circuit. A Y signal of a signal obtained by the image pickup element 151 is inputted to an AF circuit 153. The AF circuit 153 determines whether a subject is in focus or out of focus, and, if the subject is out of focus, determines whether the state of focus is front focus or rear focus, as well as to what extent the subject is out of focus. The results of these decisions are inputted to a CPU 154.

A power-on resetting circuit 155 performs various resetting operations when a power source is turned on. If a zoom switch 157 is operated by an operator, a zoom operating circuit 156 transmits the contents of the operation to the CPU 154. Memory parts 154A to 154C store the locus data shown in FIG. 2, and the memory part 154A stores direction data, the memory part 154B stores speed data, and the memory part 154C stores boundary data. Reference numerals 161 and 162 denote a zooming-motor driver and a stepping-motor driver, respectively. The number of pulses continuously inputted to a stepping motor 137 from the stepping-motor driver 162 is also continuously inputted to and counted by the CPU 154, in which the obtained count value is used as an encoder value indicative of the absolute position of the focusing lens 114. In the above-described arrangement, the position of the variator lens 112 and the position of the focusing lens 114 are respectively obtained from the value outputted from the zoom encoder 149 and the number of input pulses outputted from the stepping-motor driver 162, whereby individual points on the map of the locus data shown in FIG. 2 are determined.

The map shown in FIG. 2 is divided into rectangular small areas I, II, III, . . . , as shown in FIG. 3, by the boundary data stored in the memory part 154C. In FIG. 3, each shaded portion indicates an area in which disposition of either lens is inhibited. If the location of a point on the map is determined, a small area to which the point belongs can be determined.

The rotating speed and direction of the stepping motor, which are obtained from a locus which passes through the center of each of the small areas, are respectively stored as the speed data and the direction data for each of the small areas. In the example shown in FIG. 3, the horizontal axis (the position of the variator lens 112) is divided into 10 zones. Assuming that the speed of the zooming motor is set so that the variator lens is made to move from a telephoto end T to a wide-angle end W in 10 seconds, it takes 1 second for the variator lens to pass through one zone in a zooming direction.

Referring to FIG. 13 which is an enlarged view of the area III of FIG. 3, a locus 164 passes through the center of the area III and a locus 165 and a locus 166 pass through the bottom left and the top right of the area III, respectively, and their inclinations slightly differ from one another. The focusing lens, if it moves at a speed of x mm/1 sec, can trace the central locus 164 with almost no error.

The speed of the focusing lens obtained in this manner is hereinafter referred to as an area representative speed. A plurality of area representative speeds for the respective small areas are obtained by the number of the small areas and are stored in the speed-data memory part 154B. Assuming that the locus 168 indicates such an area representative speed, the speed of the stepping motor relative to the area III is set by finely adjusting the locus 168 to the locus 167 or the locus 169 on the basis of the detection result of an automatic focus adjustment device. The direction data is stored in the direction-data memory part 154A in the form of sign data because the direction of rotation of the stepping motor varies in each of the small areas even if zooming is performed in the same direction, for example, from the telephoto end T to the wide-angle end W (or from the wide-angle end W to the telephoto end T).

In the above-described manner, if the area representative speed obtained from the positions of the variator lens 112 and the focusing lens 114 is corrected on the basis of the detection result of the automatic focus adjustment device to determine the speed of the stepping motor 137 and this speed is used to drive the stepping motor 137 during the driving of the zooming motor 145 to control the position of the focusing lens 114, it is possible to maintain an in-focus state during zooming even in the case of a rear focus type of zoom lens.

Incidentally, it is also possible to adopt a method of storing, in addition to the area representative speeds indicated by the locus 168, speeds such as those indicated by the locus 167 and the locus 169 in the speed-data memory part and selecting three speeds according to the detection result of the automatic focus adjustment device.

In addition to the above-described methods of storing the speeds, it is also possible to adopt a method of calculating a locus which passes through a point on the map, from the current position of the variator lens and that of the stepping motor and tracing the locus, or a method of previously storing a plurality of loci as the positions of the focusing lens relative to a plurality of positions of the variator lens.

Japanese Laid-Open Patent Application No. Hei 1-321416 discloses a method of previously storing the positions of a focusing lens relative to a plurality of positions of a variator lens between a wide-angle end and a telephoto end with respect to a plurality of subject distances. In this method, when zooming is started, a point which in the map is occupied by the position of the variator lens and the position of the focusing lens at that time is detected, and an interpolation computation is performed on the basis of stored data indicative of a point closest to the detected point on the front focus side thereof and stored data indicative of a point closest to the detected point on the rear focus side thereof with respect to the same focal length, thereby calculating the position of the focusing lens for the focal length (the position of the variator lens).

FIG. 14 is an explanatory view of loci for focal lengths near the telephoto end. In the art disclosed in Japanese Laid-Open Patent Application No. Hei 1-321416, regarding the loci shown in the area I of FIG. 3 (for example, an in-focus loci for infinity), information indicative of $rr_1$, $rr_4$, $rr_7$ and $rr_9$ is stored as data indicative of the positions of the focusing lens relative to positions $V_n$ (the telephoto end), $V_{n-1}$, $V_{n-2}$ and $V_{n-3}$ of the variator lens. That is to say, a locus LL1 which passes through points $P_1$, $P_4$, $P_7$ and $P_{10}$ in the map is stored as the in-focus locus for infinity. Similarly, information indicative of $rr_2$, $rr_5$, $rr_8$ and $rr_{11}$ is stored as the positions of the focusing lens relative to positions $V_n$ (the telephoto end), $V_{n-1}$, $V_{n-2}$ and $V_{n-3}$ of the variator lens, that is to say, as a locus LL2 (for example, an in-focus locus for a subject distance of 10 m). In practice, similar data are, of course, prepared over the entire zoom range from the telephoto end to the wide-angle end.

If the variator lens is to be moved from a point ($V_n$, rr), i.e., a point P in the map, points $P_A$, $P_B$ and $P_C$ are obtained by an interpolation computation on the basis of the stored data indicative of points closest to a locus of the point P on the front focus side thereof for the respective positions of the variator lens, i.e., data on the locus LL2, and the stored data indicative of points closest to the locus of the point P on the rear focus side thereof for the same respective positions of the variator lens, i.e., data on the locus LL1. In this manner, by determining the positions of the focusing lens relative to the respective focal lengths $V_0$ (the wide-angle end), $V_1$, $V_2$, . . . , $V_{n-1}$ and $V_n$ (the telephoto end) which are used as the positions of the variator lens during zooming, it is possible to determine a locus to be traced by the focusing lens during zooming.

In the above description, because of the interpolation computation, the ratio of the distance between the points $P_1$ and P to the distance between the points $P_2$ and P becomes is equal to, for example, the ratio of the distance between the points $P_A$ and $P_4$ to the distance between the points $P_A$ and $P_5$.

As a matter of course, the aforesaid stored speed data or position data are created on the basis of optical design values which are determined on the assumption that manufacture error is zero.

Although in the above-described example a DC motor having a gear head is used as a zooming actuator, it is also possible to adopt a method which uses a stepping motor as the zooming actuator similarly to the case of the focusing lens. In this method, the absolute positions of the respective lens groups are detected not by using a volume encoder as a variator encoder but by counting the number of input pulses of the zooming actuator on the basis of a reset position similarly to the case of the stepping motor for the focusing lens.

There is also available a method of detecting a reference position of the focusing motor during the operation thereof by using a photointerrupter.

FIG. 15 is a perspective view showing a structure which uses photointerrupters in combination with a variator lens and a focusing lens, respectively. In FIG. 15, reference numeral 114 (112) denotes a focusing lens (or a variator lens), and parts denoted by reference numerals identical to those used in FIG. 11 have functions identical to those of the corresponding ones shown in FIG. 11. A light-blocking wall portion 201 is provided integrally with a moving frame for the variator lens 112 (or the focusing lens 114), and as the variator lens 112 (or the focusing lens 114) moves in the direction of the optical axis, the light-blocking wall portion 201 moves toward, for example, the position shown by two-dot chain lines in FIG. 15. A photointerrupter 202 includes a light emitting element and a light receiving element (neither of which is shown) which are disposed on opposite sides so that the light-blocking wall portion 201 can be inserted between both elements. Although not shown in FIG. 15, the photointerrupter 202 is fixed to a lens barrel (135 or 144 in FIG. 11).

FIG. 16 is a schematic view showing the positional relation between the light-blocking wall portion 201 and a light emitting element 203 and a light receiving element 204 of the photointerrupter. When the light-blocking wall portion 201 lies at the position shown by solid lines, the space between the light emitting element 203 and the light receiving element 204 is not obstructed. Therefore, a sufficiently large output can be obtained from the light receiving element 204. Letting L be the entire movable range of the moving frame, if the light-blocking wall portion 201 is moving in the range between L/2 and L, i.e., toward the right side as viewed in FIG. 16, the space between the light emitting element 203 and the light receiving element 204 is obstructed and almost no output is obtained from the light receiving element 204.

The position of the light-blocking wall portion 201 that is shown by two-dot chain lines in FIG. 16 represents the rightmost position of the moving frame in the movable range thereof. When the light-blocking wall portion 201 lies at that position, the space between the light emitting element 203 and the light receiving element 204 is obstructed.

FIG. 17 is a graph in which the horizontal axis represents the position of the moving frame in the direction of the optical axis, while the vertical axis represents the output of the light receiving element 204. If a threshold Th is set in this output, when the movable frame is moved in the direction of the optical axis, the output reaches the threshold Th always at a position L/2 as viewed in FIG. 17, and this position can be detected as an absolute value. Accordingly, if the absolute position of a lens group which is moving is to be detected, first, the output of the light receiving element 204 is checked when a main power source is turned on, and if the output is above the threshold Th, the stepping motor is driven to move the movable frame toward the right in this example, whereas if the output is below the threshold Th, the stepping motor is driven to move the movable frame toward the left in this example, whereby the position L/2 is detected and an address corresponding to the absolute position is assigned a predetermined numerical value. Then, driving pulses which are inputted to the stepping motor are continuously counted to detect the absolute position of the lens group which is moving.

FIG. 18 is a view similar to FIG. 2 in which the horizontal axis represents the position of the variator lens, while the vertical axis represents the position of the focusing lens, and FIG. 18 also shows the outputs of the respective photointerrupters.

As shown in FIG. 18, it is necessary to eliminate the deviation of locus information from actual positions of the two lens groups (the variator and focusing lenses) by "superimposing" the locus information on the actual positions of the two lens groups, the locus information indicating the positional relation between the two lens groups for previously stored subject distances as described previously with reference to FIG. 14 and the like. For example, in FIG. 18, a position N indicates a point at which the focusing lens can bring a subject lying at infinity into focus when the variator lens is located at the wide-angle end. Assuming that the stored locus information contains information which indicates that if the focusing lens is focused at infinity when the variator lens is set to the wide-angle end, the position of the variator lens is assigned address 100 and the position of the focusing lens is assigned address 100, an absolute address of a reset position (a position at which the output of the photointerrupter reaches the threshold Th) may be determined and written to an $E^2PROM$ so that the N position of each of the variator lens and the focusing lens can be assigned address 100. In the example shown in FIG. 18, assuming that there is a positional difference of 1,000 pulses between the position N and the reset position of the variator lens and there is a positional difference of 400 pulses between the position N and the reset position of the focusing lens, the position N can be assigned address 100 in the case of either of the variator lens and the focusing lens if the respective reset positions of the variator lens and the focusing lens are assigned address 1100 and address 500.

Each time the power source is turned on, these moving lens groups are moved to their respective reset positions and, in this example, the reset positions of the variator lens and the focusing lens are respectively assigned address 1100 and address 500, whereby the operation of the above-described "superimposition" is completed. After that, an image forming position can be correctly held during zooming.

However, in the above-described conventional example, the writing of addresses to the $E^2PROM$ on the basis of reset positions, such as that described above in connection with FIG. 18, is performed during an apparatus manufacturing process in a factory or the like. If the position N shown in FIG. 18, at which the focusing lens is focused at infinity for the wide-angle end, moves toward, for example, a position N' owing to a later environmental variation or the like, or if the reset positions themselves vary, the following relations will be impaired: "the position of the variator lens at the wide-angle end is assigned address 100 (in the aforesaid example)" and "the position of the focusing lens which is focused at infinity for the wide-angle end is assigned address 100 (in the aforesaid example)". That is to say, a deviation occurs in the aforesaid "superimposition". This leads to a number of problems. For example, not only does defocus occur during zooming, but also if the movable range of the focusing lens is defined with the aforesaid addresses according to the focal length (for example, the focusing lens is allowed to move only in the range of address 80 to address 150 when the variator lens is located at the wide-angle end), it becomes impossible to focus a subject lying at infinity.

This situation occurs because the positions of the lens groups are deviated by temperature or humidity variations due to expansion or shrinkage of various portions of the lens groups when an actual operating environmental temperature or humidity differs from an environmental temperature or humidity at which the writing of addresses to the E²PROM at reset positions is performed. Otherwise, if a plastic material such as acrylic is used as a lens material, the aforesaid situation occurs not only due to such a mechanical deformation but also due to a variation in the properties, such as refractive index, of the material.

The idea of disposing a temperature sensor for correcting such a deviation of a focus position due to a temperature variation has heretofore been known. However, since the amount of focus deviation due to a temperature variation differs between individual lenses, there unavoidably remains an uncorrected deviation if a dispersion of the output gain of the temperature sensor is taken into account. The use of the temperature sensor is necessarily disadvantageous in terms of space and cost. Furthermore, in a case where a heat source such as a CCD image forming element, which is disposed in an apparatus such as a video camera, shows a temperature rise up to a considerably high temperature with time after the power source is turned on, a non-uniform temperature distribution complicatedly associated with environmental temperature occurs in either of the lens groups, so that it may become impossible to fully correct a focus deviation merely by disposing a single temperature sensor.

A focus movement (or focus deviation) is caused by a factor such as a moisture absorption, in addition to a temperature variation.

Furthermore, in the case of an interchangeable lens type of camera, when an interchangeable lens is removed from one camera body and mounted on another camera body, a focus deviation occurs irrespective of the presence or absence of a variation in temperature or humidity if there is a difference between the flange back lengths of the camera bodies.

In particular, in the field of video cameras in which the size of an image-forming image plane is becoming smaller and smaller while the number of pixels per CCD is increasing more and more, even if the differences between the flange back lengths of individual interchangeable lens type of video cameras are reduced to ±0.01 mm or less, it may not be possible to completely correct a slight focus deviation.

In addition, in the current trend toward further reductions in the sizes and weights of video lenses, it is desirable to omit the aforesaid reset switch.

Incidentally, the above-described focus movement due to a temperature variation differs in amount for different focal lengths. For example, if the position of the first group 111 varies in the direction of the optical axis, in general, the amount of focus movement is small on the wide-angle side and is remarkably large on the telephoto side.

The focus movement on the telephoto side, even if it occurs, has a tendency to shift focus from a locus of one subject distance toward a locus of another subject distance; for example, as viewed in FIG. 2, a locus of 1 m becomes equivalent to a locus of 2 m, and no remarkable focus deviation occurs at any intermediate zoom position. Therefore, even if the focus movement on the telephoto side is not completely corrected, if the focus movement on the wide-angle end is corrected, a remarkable defocus does not occur when zooming from the telephoto side toward the wide-angle side is performed after the completion of automatic or manual focusing for an arbitrary focal length other than the wide-angle end.

Contrarily, the position of the focusing lens for the wide-angle end is approximately the same irrespective of subject distances as shown in FIGS. 2 and 18, so that if such position deviates, defocus occurs irrespective of subject distances whenever zooming from the wide-angle side toward the telephoto side is performed.

The present invention is intended to provide a method of highly accurately correct focus deviations such as the above-described ones.

BRIEF SUMMARY OF THE INVENTION

In accordance with one aspect of the present invention, there is provided a lens device which comprises an optical system including a first lens which performs a magnification varying operation, and a second lens which is positioned rearwardly of the first lens along an optical axis and performs a focus adjusting operation, first detecting means for detecting a position of the first lens and a position of the second lens, second detecting means for detecting a state of focus, storage means which stores a relation between positions of the first lens and the second lens in a reference environment, the position of the first lens assuming an in-focus state, and correcting means, wherein if the position of the first lens and the position of the second lens detected by the first detecting means deviate from the positional relation stored in the storage means, when an in-focus state is detected by the second detecting means, the correcting means corrects a position detection by the first detecting means on the basis of that deviation.

In accordance another one aspect of the present invention, there is provided a lens device which comprises an optical system including a first lens which performs a magnification varying operation, and a second lens which is positioned rearwardly of the first lens along an optical axis and performs a focus adjusting operation, first detecting means for detecting a position of the first lens and a position of the second lens, second detecting means for detecting a state of focus, storage means which stores a relation between positions of the first lens and the second lens in a reference environment, the position of the first lens assuming an in-focus state, third detecting means for detecting an environmental state such as temperature and humidity, and correcting means, wherein if the position of the first lens and the position of the second lens detected by the first detecting means deviate from the positional relation stored in the storage means, when an in-focus state is detected by the second detecting means, the correcting means corrects a position detection by the first detecting means on the basis of that deviation and a detection result of the third detecting means.

The above and other objects, features and advantages of the present invention will become apparent from the following detailed description of preferred embodiments of the present invention, taken in conjunction with the accompanying drawings.

BRIEF DESCRIPTION OF THE SEVERAL VIEWS OF THE DRAWING

FIG. 25 is an explanatory view showing the variations of driving of a stepping motor due to an environmental temperature;

DETAILED DESCRIPTION OF THE INVENTION

Preferred embodiments of the present invention will be described below with reference to the accompanying drawings.

(First Embodiment)

Figure 18:
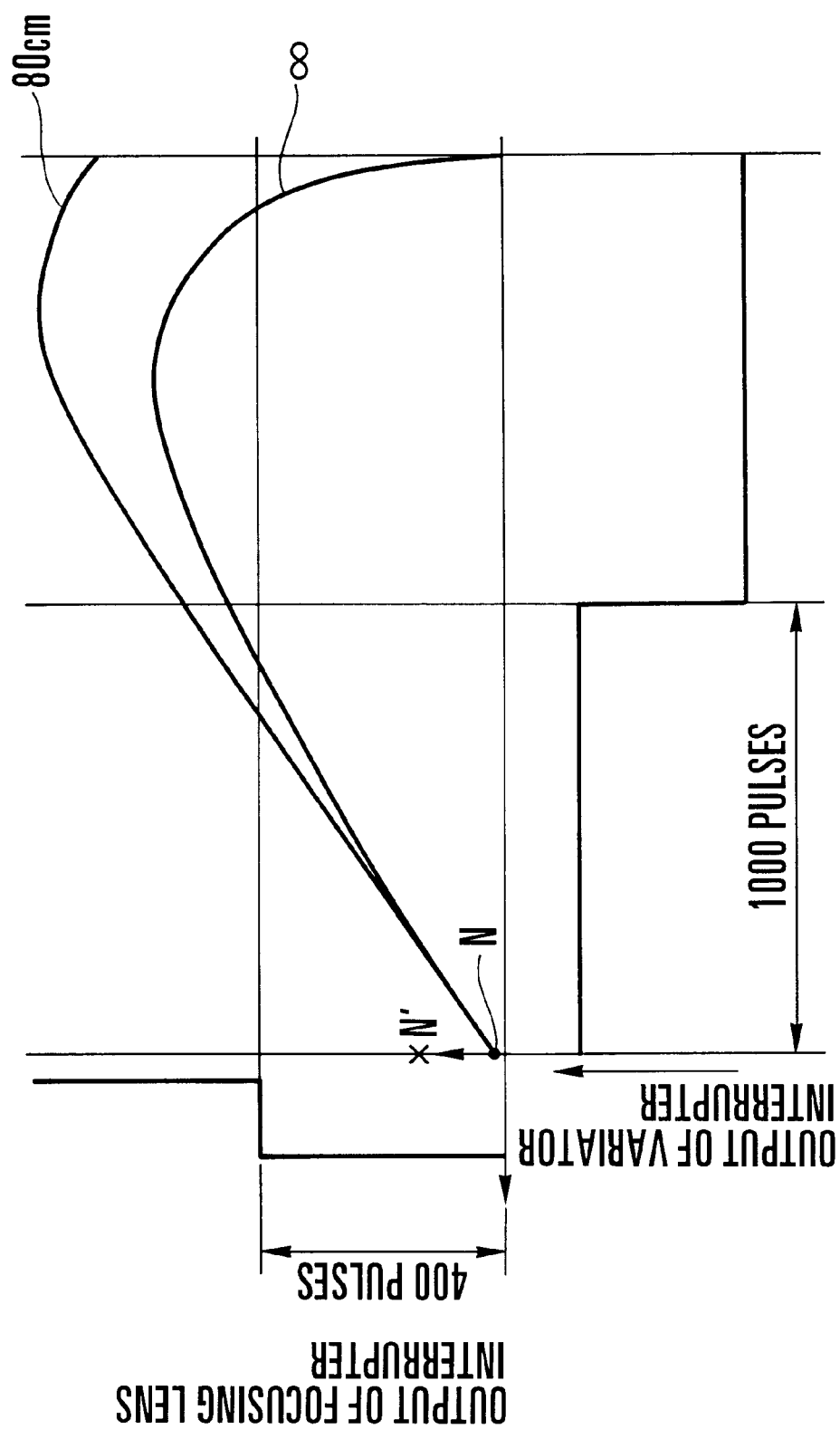
FIG. 18 is an explanatory view showing movement loci of the focusing and variator lenses from their reset positions.

A video camera to which the present invention is applied will be described below by way of example. ¼-inch-size CCDs which have a diagonal size of about 4 mm are becoming more popular as image pickup elements which are currently widely used in video cameras (and still video cameras), and it is considered that CCDs of ⅓-inch size or less will become popular in the near future. In the case of a video camera which, when it is set to its wide-angle end, has a focal length $f_W$ of 4.0 mm, a fully-open F value of F1.8 and the diameter of an allowable circle of confusion, "$\delta_{MAX}$", of 0.011 mm, a hyper focal distance H can be approximated to be $f_W^2/(\delta_{MAX} F)=808$ mm, and the near point of its depth of field is 404 mm, i.e., the depth of field ranges from 40 cm to infinity. In contrast, in the case of a 135-format silver halide camera which, when it is set to its wide-angle end, has a focal length $f_W$ of 40 mm, a fully-open F value of F3.5 and the diameter of an allowable circle of confusion, "$\delta_{MAX}$", of 0.03 mm, a hyper focal distance H can be approximated to be 15238 mm, and the near point of its depth of field is 7620 mm, i.e., the depth of field ranges from 7.6 m to infinity. As is apparent from these cases, a camera which uses a CCD as an image sensor can obtain a depth of field far larger than can be achieved with a silver halide camera at approximately the same angle of view, and if the point N of FIG. 18 is set to, for example, 80 cm, the range of 40 cm to infinity can be actually focused. (If a closer distance is to be focused, it is necessary to move a focusing lens toward a point N' in the example of FIG. 18.) If the closest photographing distance of this lens system is 10 cm, the amount of forward movement of the lens system is approximately 0.17 mm if the sensitivity of the focusing lens is "1".

According to an actual measurement conducted by the present inventor, in the case of a general video camera lens system in which all the lenses are made of glass, a focus displacement due to temperature is approximately 0.03 mm for a temperature variation of 25° C. in terms of the focusing-lens position of FIG. 18 when the video camera lens system is set to its wide-angle end. If plastic is used as a lens material, a focus displacement, although it depends on the number and disposition of lenses made of plastic, is, for example, 0.1 mm for a temperature variation of 25° C., and a large focus deviation of 0.3 mm may occur according to design.

Figure 19:
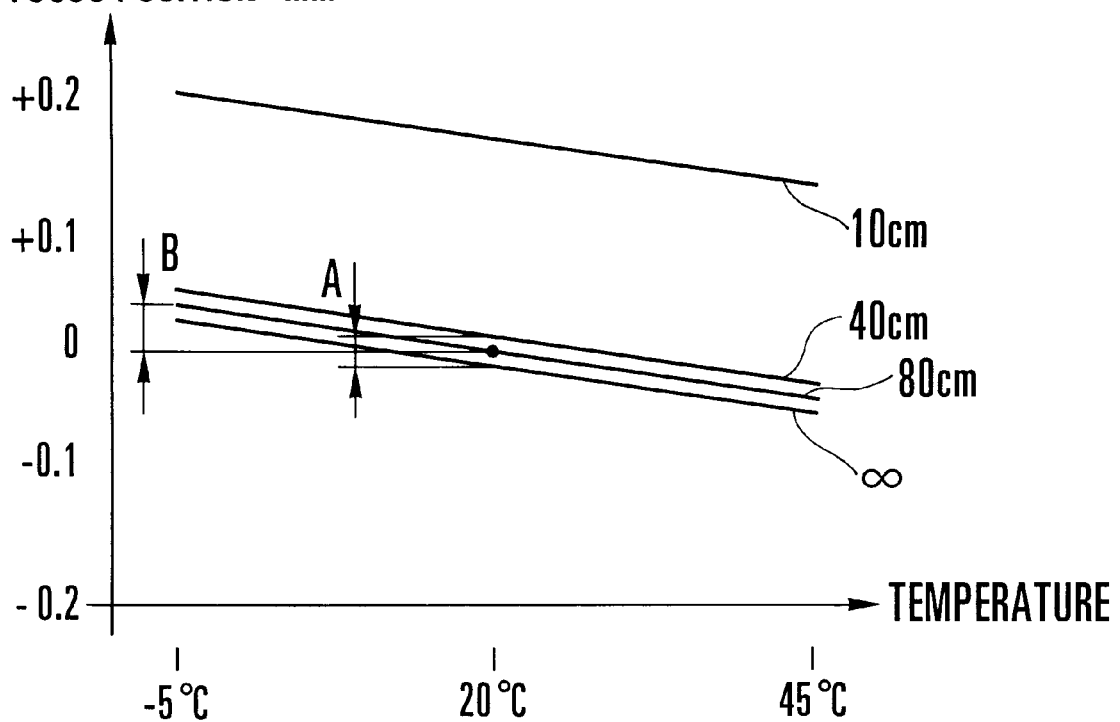
FIG. 19 is an explanatory view showing the relation between temperature and position deviation at a wide-angle-end in-focus position in an arrangement in which glass lenses are used.
Figure 20:
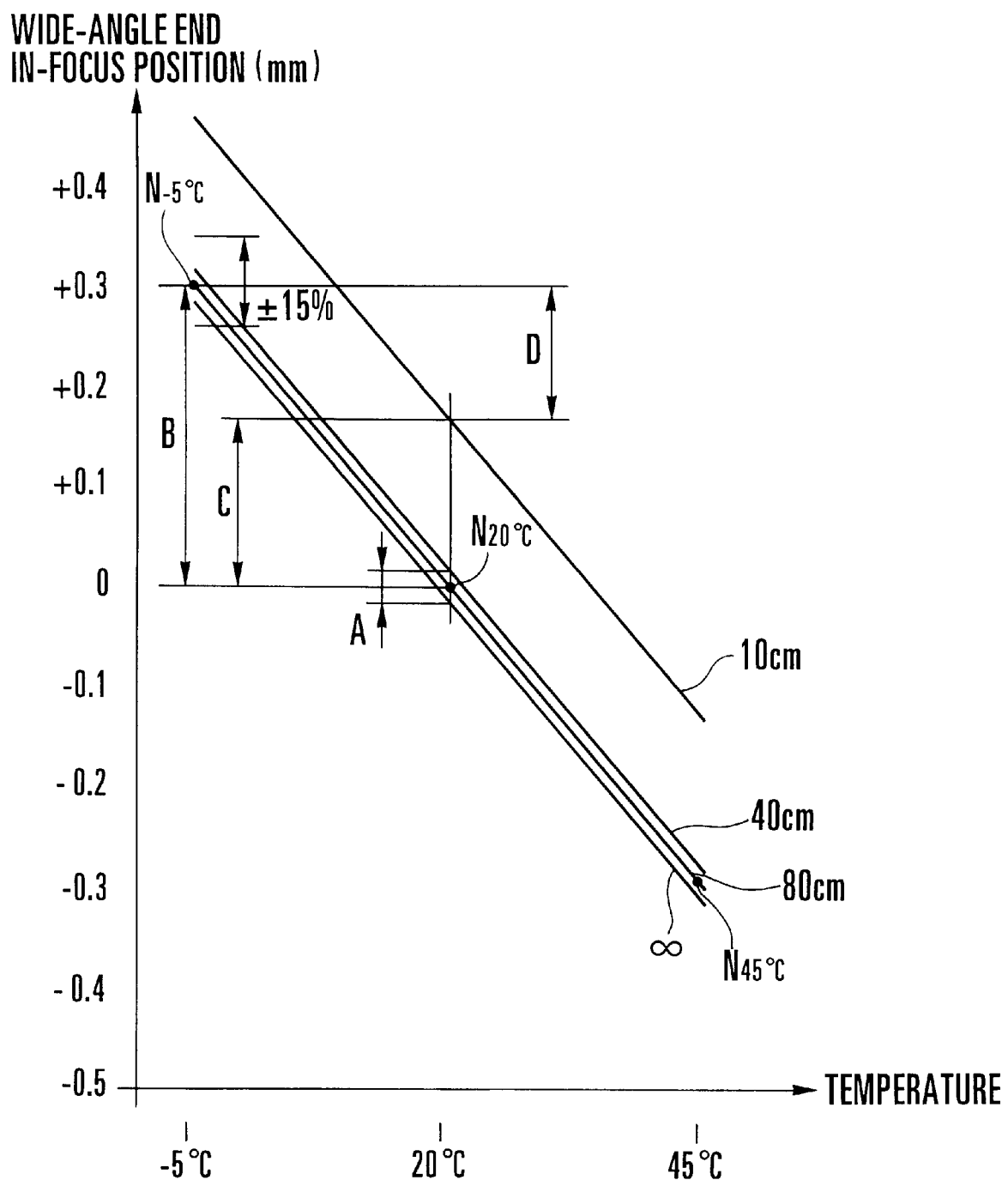
FIG. 20 is an explanatory view showing the relation between temperature and position deviation at a wide-angle-end in-focus position in an arrangement in which plastic lenses are used.

FIG. 19 is a graph showing the relation between temperature and the position of the focusing lens of the video camera of $f_W$=4 mm whose lenses are made of glass, and FIG. 20 is a graph showing the relation between temperature and the position of the focusing lens of one example of a video camera using plastic lenses. In each of FIGS. 19 and 20, the horizontal axis represents temperature, while the vertical axis represents the position of the focusing lens. "0" on the vertical axis indicates the position of the focusing lens which is in focus for a subject distance of 80 cm at 20° C.

As is apparent from FIGS. 19 and 20, assuming that a practical subject distance ranges from 80 cm to infinity, a variation B in focus position which occurs due to a temperature variation of 25° C. and the amount of movement, "A", of the focusing lens between 80 cm and infinity, even if the focusing lens is made of glass, generally takes on the relation of B≅A as shown in FIG. 19, although such relation depends on the contents of design. If the focusing lens is made of plastic, the relation between the variation B in focus position and the amount of movement, "A", takes on B=approximately 8×A to 10×A as shown in FIG. 20, although such relation depends on the contents of design.

Accordingly, even in the case of FIG. 19, by detecting the position of the focusing lens which is in focus for a general distance other than an extremely close distance such as 10 cm, it is possible to approximately detect the amount of focus deviation due to temperature (and other causes), and in the case of FIG. 20, it will be possible to distinctly detect such amount. In particular, if a lens system of the type which causes a large focus deviation such as that shown in FIG. 20 has a detection accuracy of approximately 15% with respect to the variation B in focus position as the result of the dispersion of the detection accuracy of a temperature sensor and the dispersion of the amount of focus deviation of each individual lens, such lens system exhibits a detection error within the range of ±15% as shown in FIG. 20. Since such range is in excess of the depth of field "A", it is impossible to correct the focus deviation by means of a depth of field, even with a correcting circuit having a temperature sensor, so long as an adjustment which takes differences between individual lens systems in account is not made. In contrast, a correction method which detects a focus position can realize high accuracy without a detection error because this correction method directly detects an in-focus position. The correction method will be specifically described below. Referring to FIG. 20, a subject lying at an arbitrary distance of 40 cm to infinity is brought into focus within the range of $N_{20}°$ C.±A/2 at 20° C., where A/2 denotes the amount of driving by a stepping motor for approximately two pulses. A reset address for the variator lens and that for the focusing lens are respectively assigned address 1100 and address 500 so that the respective positions of the variator lens and the focusing lens occupy addresses 100 with respect to the point N when the lens system is set to the wide-angle end and is in focus for infinity. The addresses 1100 and 500 are stored in an E²PROM. If the production process of writing addresses 1100 and 500 into the E²PROM is conducted at a temperature of 20° C., the position of the focusing lens at a point $N_{20° \ C.}$ occupies address 100. Therefore, when an autofocus mechanism works and detects that a subject lying at an arbitrary distance of 80 cm to infinity is in focus with the lens system being set to the wide-angle end at 20° C., the position of the focusing lens ought to occupy any of addresses 100±2, i.e., addresses 98 to 102. Letting B=40 pulses, if a temperature variation of 25° C. occurs during the above state, the position of the focusing lens will occupy any of addresses 138 to 142 at −5° C. or any of addresses 58 to 62 at +45° C. Therefore, if the difference from reference address 100, for example, −40=100−140 for address 140 at −5° C., is used as a correction value and the reset address is changed to 460=500−40, the address for a point $N_{-5° \ C.}$ can be corrected from 140 to 100.

Figure 1:
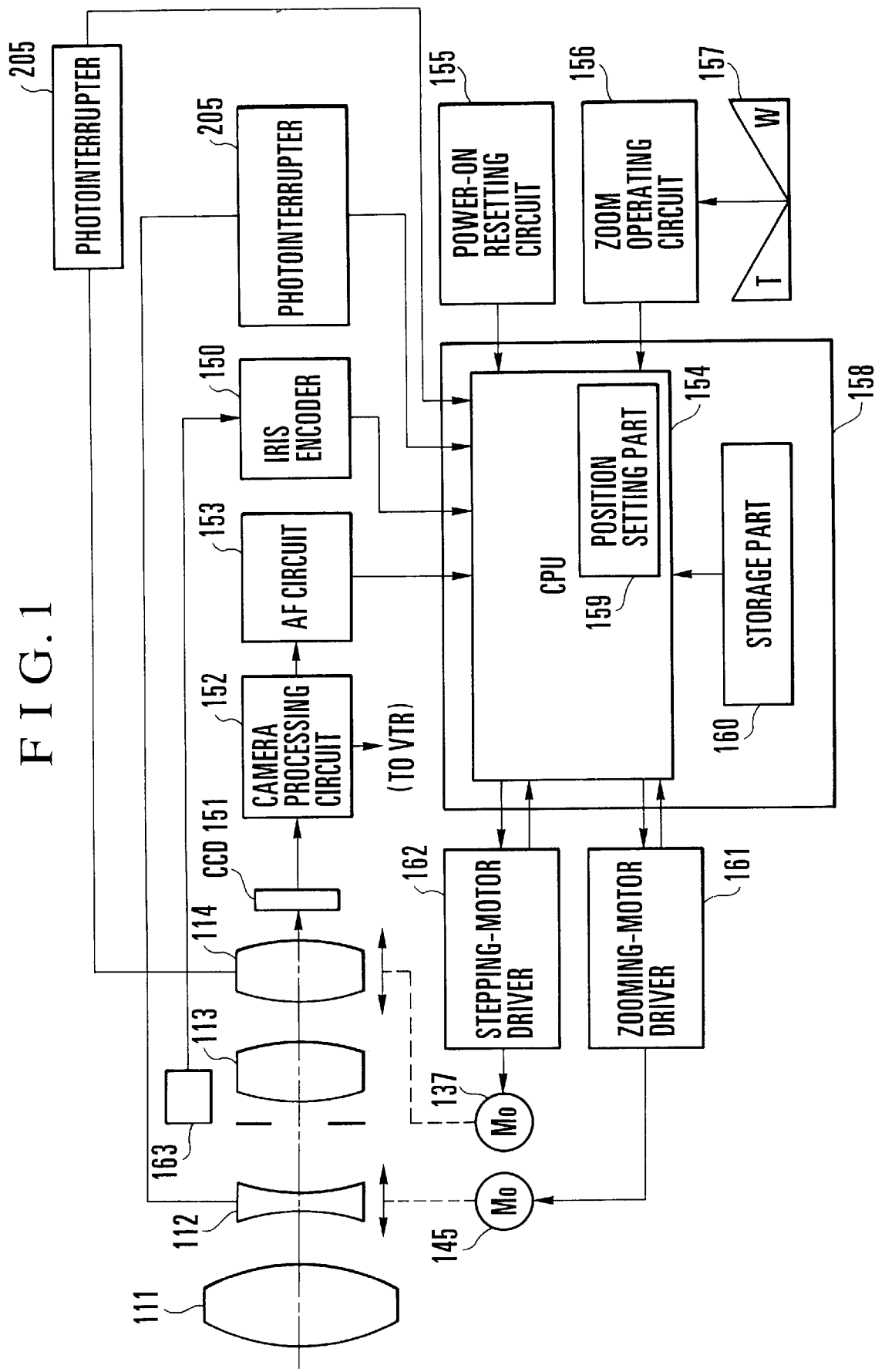
FIG. 1 is a block diagram of a video camera according to a first embodiment of the present invention.
Figure 12:
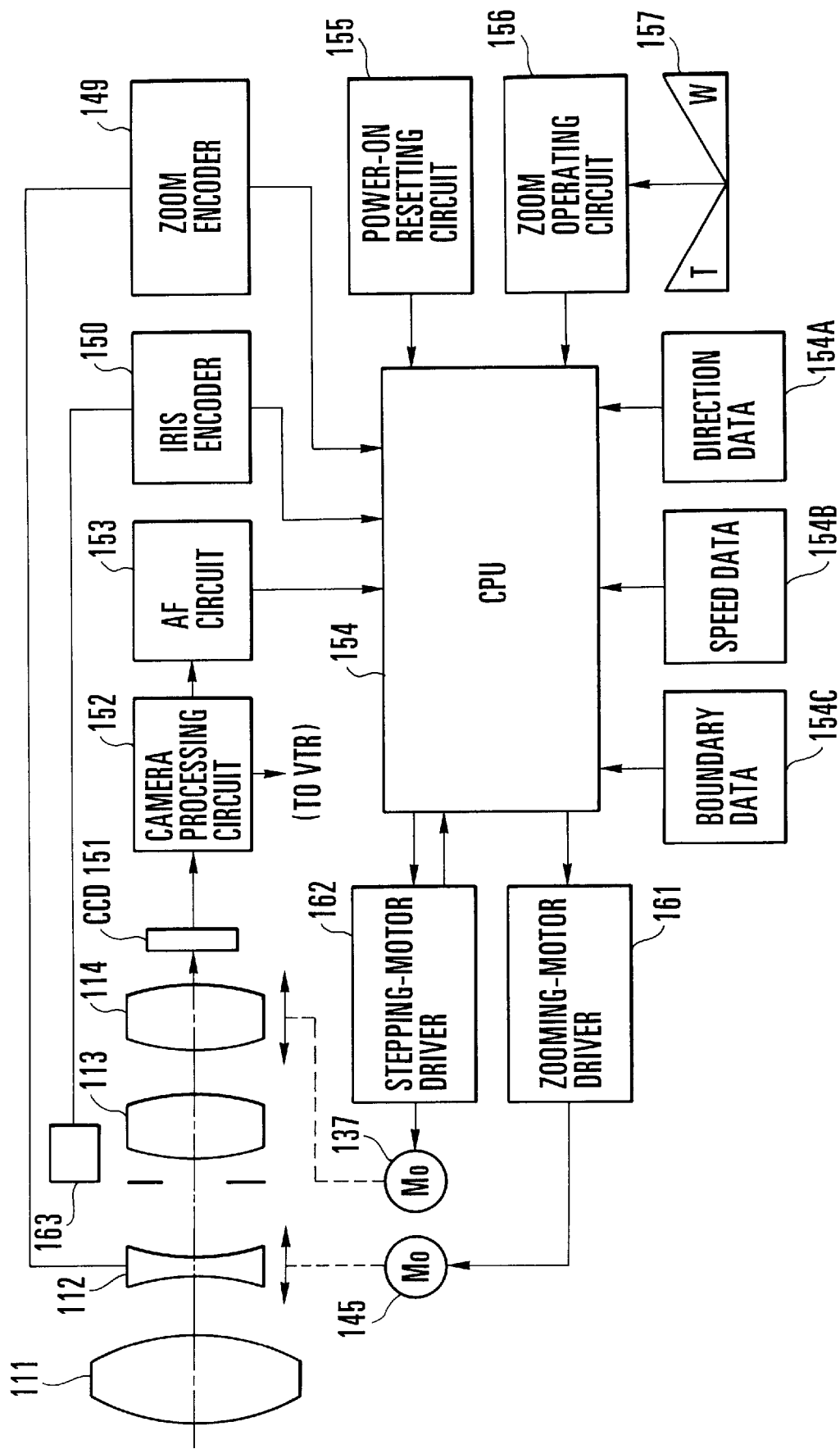
FIG. 12 is a block diagram of a conventional video camera.
Figure 13:
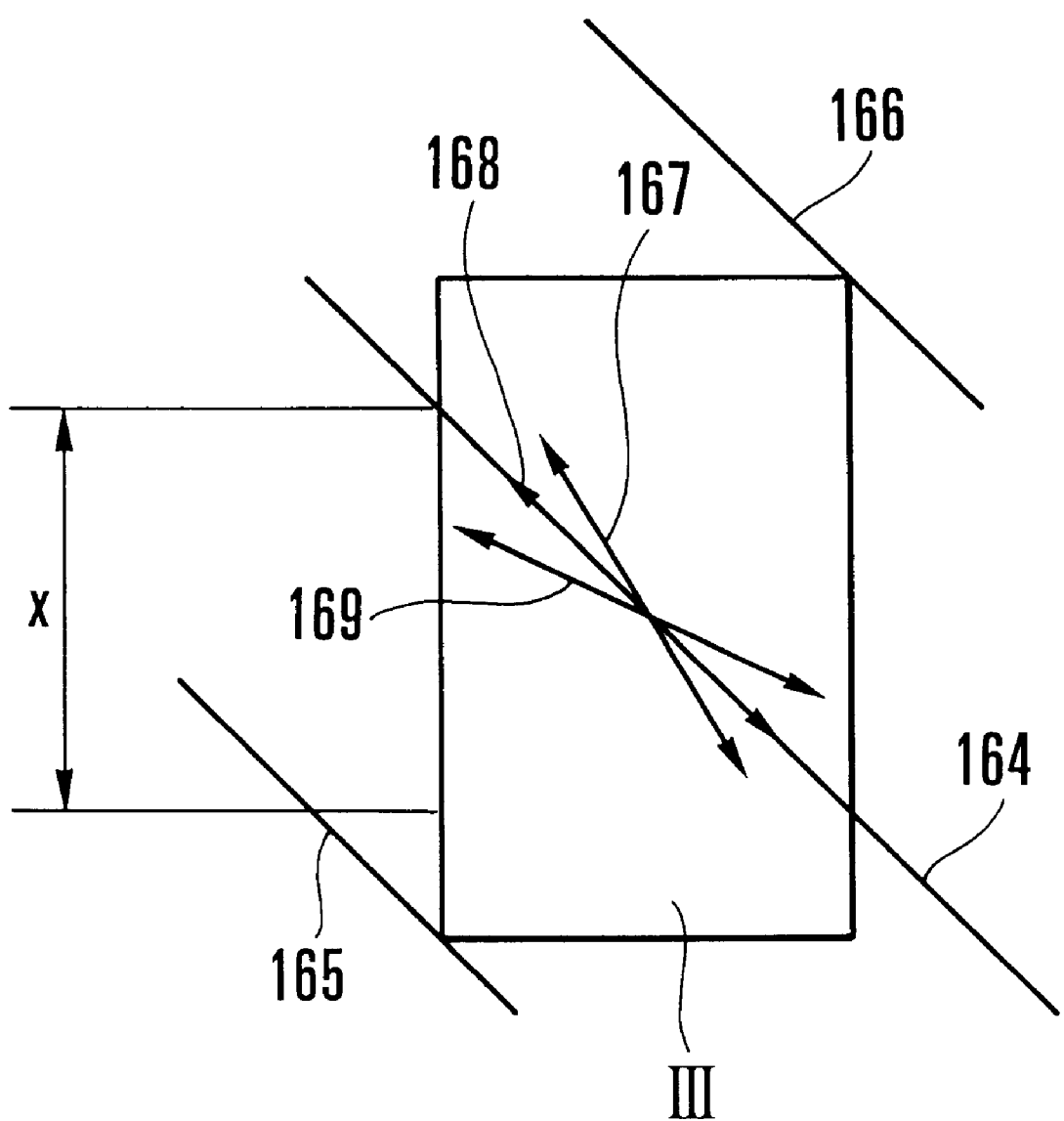
FIG. 13 is an explanatory view showing the control of the movement of a focusing lens.
Figure 14:
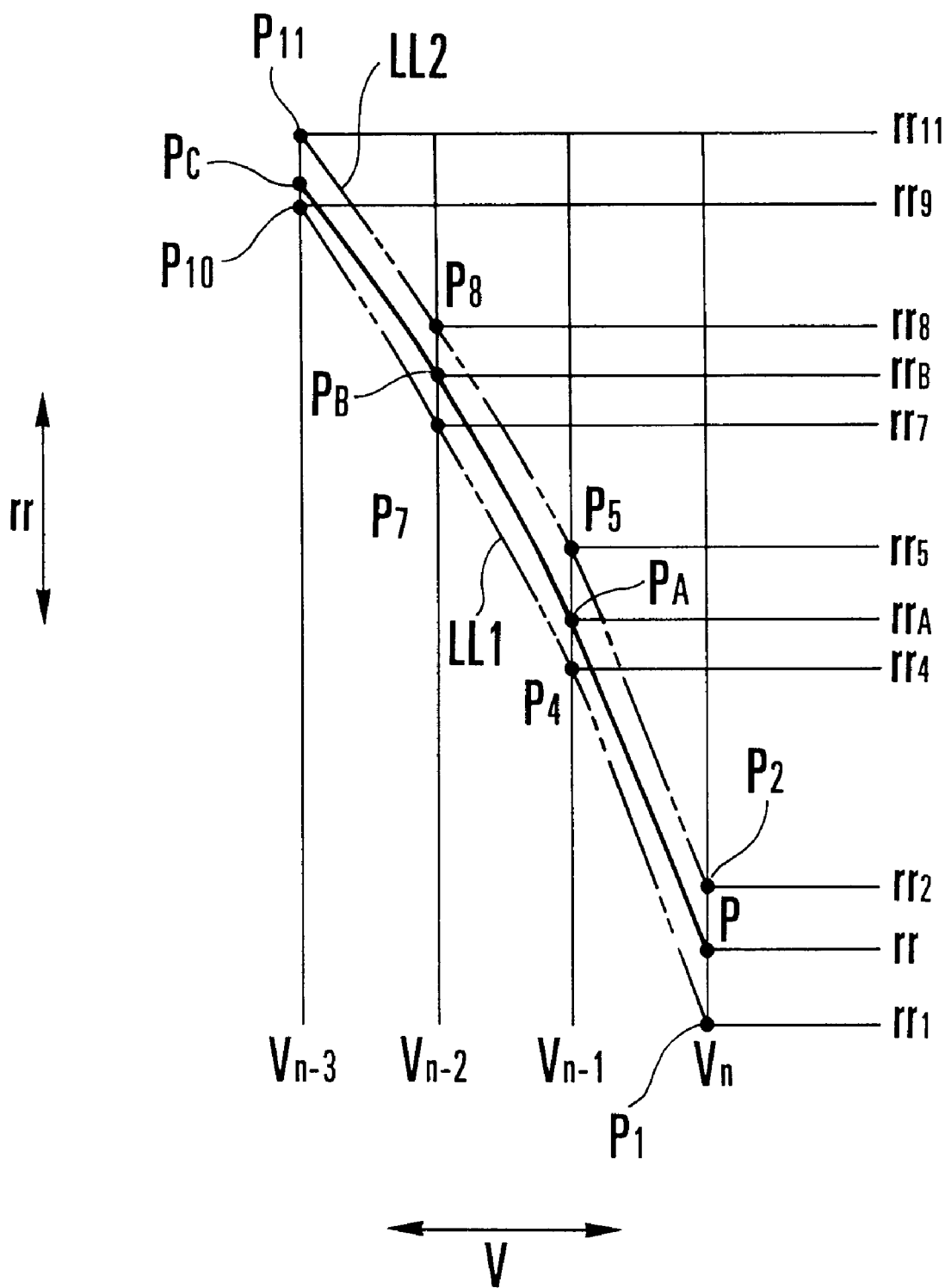
FIG. 14 is an explanatory view showing movement loci of the focusing and variator lenses near a telephoto end.
Figure 15:
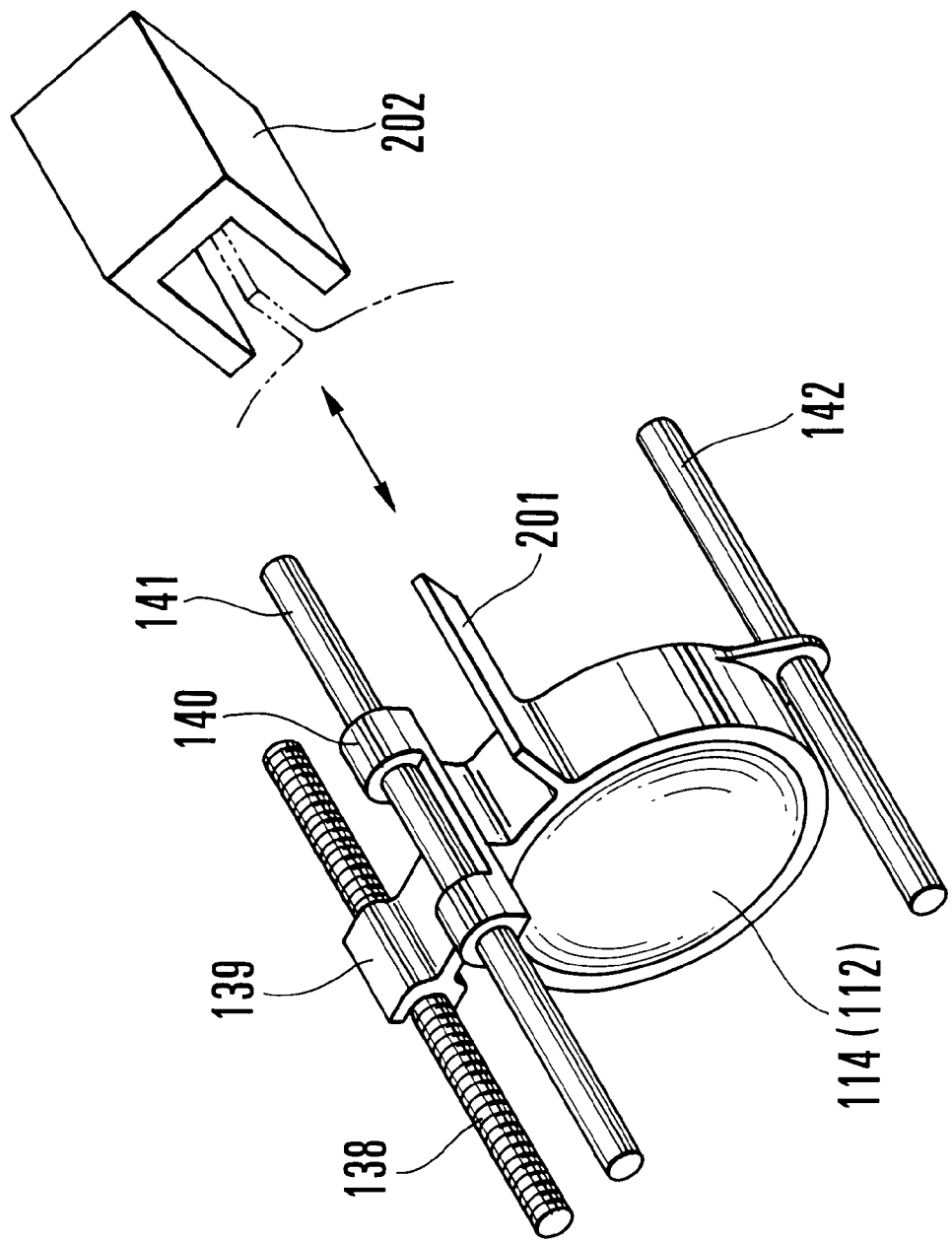
FIG. 15 is a partial perspective view of a lens barrel which uses photointerrupters for resetting purpose.
Figure 16:
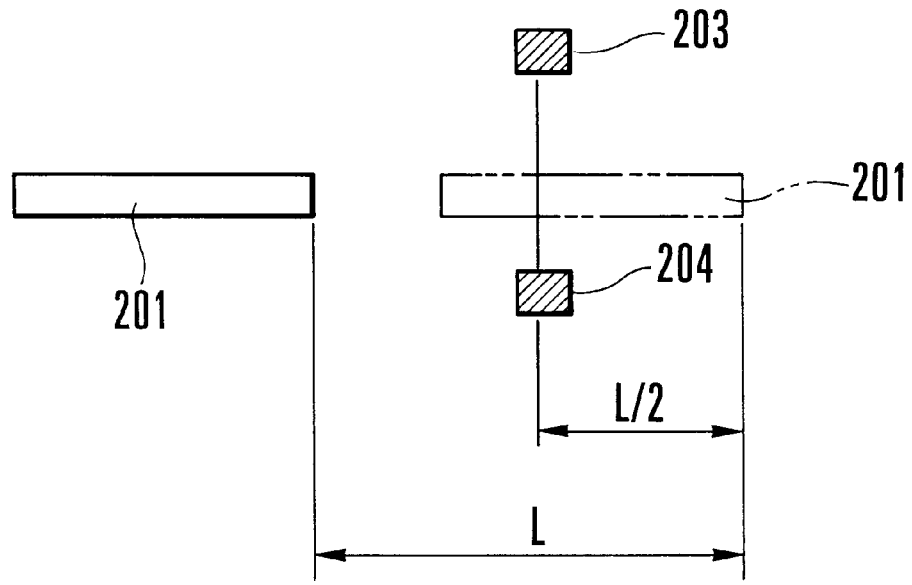
FIG. 16 is an explanatory view of a resetting operation in the portion shown in FIG. 15.

FIG. 1 is a block diagram showing one example of a video camera according to the present invention. Lens groups 111 to 114 are identical to the corresponding ones shown in FIG. 12, and other blocks denoted by reference numerals identical to those used in FIG. 12 have functions identical to those of the corresponding blocks shown in FIG. 12. Stored in a storage part 160 are a plurality of in-focus positions of the focusing lens with respect to a plurality of positions to be occupied by the variator lens between the wide-angle end and the telephoto end thereof against a plurality of subject distances such as those shown in FIG. 2. A position setting part 159 of a CPU 154 constitutes, for example, part of the E²PROM and, as described above by way of example, has data required for superimposing the stored data, such as reset address 1100 for the variator lens and reset address 500 for the focusing lens, and the actual positions of the variator lens and the focusing lens on each other. (Incidentally, even if a zoom encoder is not an encoder which counts the number of input pulses of each stepping motor on the basis of a reset position by means of a photointerrupter, but a volume encoder of the type described previously in connection with FIG. 12, completely the same position setting is effected by assigning, for example, address 1100 to a position indicative of a predetermined output value of the volume encoder.)

Figure 17:
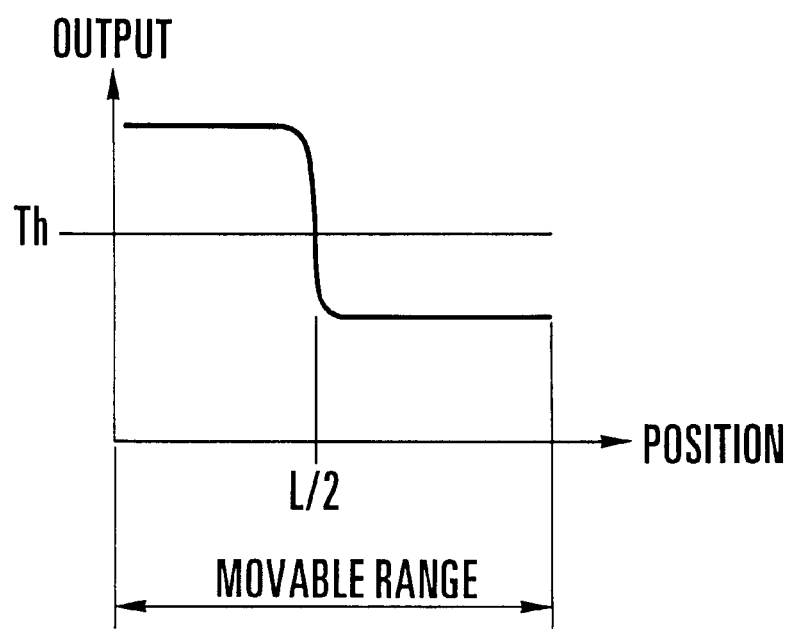
FIG. 17 is an explanatory view of an output variation during the resetting operation.

In operation, if a power-on resetting circuit 155 detects that a power source has been turned on, a control part 158 starts a resetting operation, and the focusing lens 114 and the variator lens 112 are respectively moved to their reset positions by the driving of driver circuits 162 and 161 and motors 137 and 145. In this case, the CPU 154 detects the output of a photointerrupter 205 which serves as a reset switch, compares the level of the output with a threshold Th as shown in FIG. 17, and determines directions in which to drive the respective motors 137 and 145. After the CPU 154 has located the variator lens 112 and the focusing lens 114 at the respective reset positions at which the level of the output of the photointerrupter 205 reaches the threshold Th, the CPU 154 assigns address 1100 and address 500 to the respective reset positions of the variator lens 112 and the focusing lens 114, as described above by way of example, and then starts an actual operation while continuing to count the number of input pulses and detecting addresses. In the first embodiment of the present invention, during the actual operation, the CPU 154 checks whether the state of the camera conforms to the conditions of detection of a reset address correction value. The conditions are such that the variator lens is located, for example, at the wide-angle end or in a predetermined range close to the wide-angle and an automatic focus detecting device has detected that a subject is securely in focus.

When such conditions are satisfied, if the focusing lens 114 is focused at an address other than addresses 100±2 (at a fully open aperture value) when the variator lens 112 is set to the wide-angle end in the above-described example, the CPU 154 stores the difference between the address and the addresses 100±2 in the E²PROM as a correction value (if the first correction value is already stored when the second correction value or later is to be stored, the second correction value or later is added to the previous correction value), and the CPU 154 shifts the address by such correction value to correct a focus deviation. The calculation of the correction value is possible if the depth of field at the wide-angle end has a wide range necessary and sufficient for the above-described detection. In such calculation, although the value of a reference address (address 100 in the above-described example) differs according to the address of the variator lens 112, the value may be calculated from the data of the storage part 160 according to each zoom address.

A condition required to determine that a subject is securely in focus is that, for example, in a so-called TV signal autofocus system which is arranged to obtain a plurality of evaluation values by passing a contrast signal (Y signal) of a video signal through a plurality of different band-pass filters and locate a focusing lens at a position corresponding to a signal peak by using the plurality of evaluation values, the levels of the evaluation values are sufficiently high, and when the focusing lens is moved back and forth from an in-focus position of the focusing lens by an amount which takes an F value into account, variations in the evaluation values can be securely obtained.

The program of the above-described operation of the CPU 154 will be described below with reference to the flowchart of FIG. 4.

The process is started in Step 401. In Steps 402 to 406, a check is made as to a condition for determining whether to perform a calculation of the correction value. Specifically, in Step 402, it is determined whether the current focal length f is at the wide-angle end or in a predetermined range close to the wide-angle end. If the focal length f is equal to or smaller than a predetermined threshold $f_{Th}$, it is determined that the answer is Y (YES), and the process proceeds to Step 403. If the focal length f exceeds the predetermined threshold $f_{Th}$, it is determined that the answer is N (NO). In Step 402, the value of the focal length f is substitutionally detected from the address of the variator lens 112 (position information relative to the variator lens 112). In Step 403, it is determined whether the automatic focus adjustment device (AF device) is on. If the AF device is on, the process proceeds to Step 404, whereas if the AF device is off, it is determined that the answer is N and detection of a correction value is not performed. In Step 404, it is determined whether the AF device is in focus. If it is determined whether the AF device is in focus, the accuracy of the decision is determined in Steps 405 and 406. In Step 405, it is determined whether an evaluation value $V_F$ for AF operation exceeds a predetermined value $V_{Th}$. The reason why Step 405 is inserted is that the AF device works to detect an in-focus position even in the case of a low-contrast subject or a low-luminance subject which is disadvantageous to AF operation, but since the calculation of the correction value requires that a subject be more accurately in focus, it is necessary to exclude a low-accuracy condition even in the case of the same degree of in-focus state. For this reason, if the precision of the AF device is very high, Step 405 and Step 406 to be described later may be omitted. In Step 406, by moving the focusing lens 114 back and forth from an in-focus point by a predetermined amount according to a depth of field (mainly, an F value), it is determined whether a variation $\Delta V_F$ of the evaluation value obtained at this time is greater than a predetermined value $\Delta V_{Th}$, for the purpose of excluding a condition such as the state in which if a subject is a high-luminance subject such as a neon sign, an image of the subject, even if it is out of focus, does not lose a sharp edge and produces a large evaluation value. If it is determined in Step 406 that the variation $\Delta V_F$ is equal to or smaller than the predetermined value $\Delta V_{Th}$, it is determined that the in-focus subject is a high-luminance subject and the accuracy of the decision made in Step 404 is low, and the calculation of a correction value is not performed. If the answer in each of Steps 402 to 406 is Y, a reference address $P_f$ is determined according to the focal length f in Step 407. In the aforesaid example, if the focal length f is at the wide-angle end, the reference address $P_f$ is 100. On the other hand, if the answer is N in at least one of Steps 402 to 406, the process returns to Step 402.

In Step 408, the expression $|P_F - P_f| > \Delta P_F \times F$ is calculated, where $P_F$ represents the current address of the focusing lens 114, $\Delta P_F$ represents a numerical value equivalent to a threshold, and F represents an F value or a constant obtained from table data or the like according to the F value.

For example, if $\Delta P_F = 2$ and $F = 1.8$, the value of the right side of the expression becomes 3.6, and if $P_F = 103$ and $P_f = 100$, the relation between the left side and the right side becomes 3<3.6. Therefore, it is determined that updating of a correction value need not be performed. On the other hand, if $P_F = 105$, the relation between the left side and the right side becomes 5>3.6, and the process proceeds to step 409.

In Step 409, $\Delta A_0 = P_f - P_F$ is calculated to calculate the correction value $\Delta A_0$. In Step 410, a total correction value $\Delta A_1$ cumulatively obtained after the power source has been turned on is updated by adding the current correction value $\Delta A_0$ to the previous total correction value $\Delta A_1$. Then, in Step 411, the current address $P_F$ of the focusing lens 114 is corrected by the correction value $\Delta A_0$.

Figure 4:
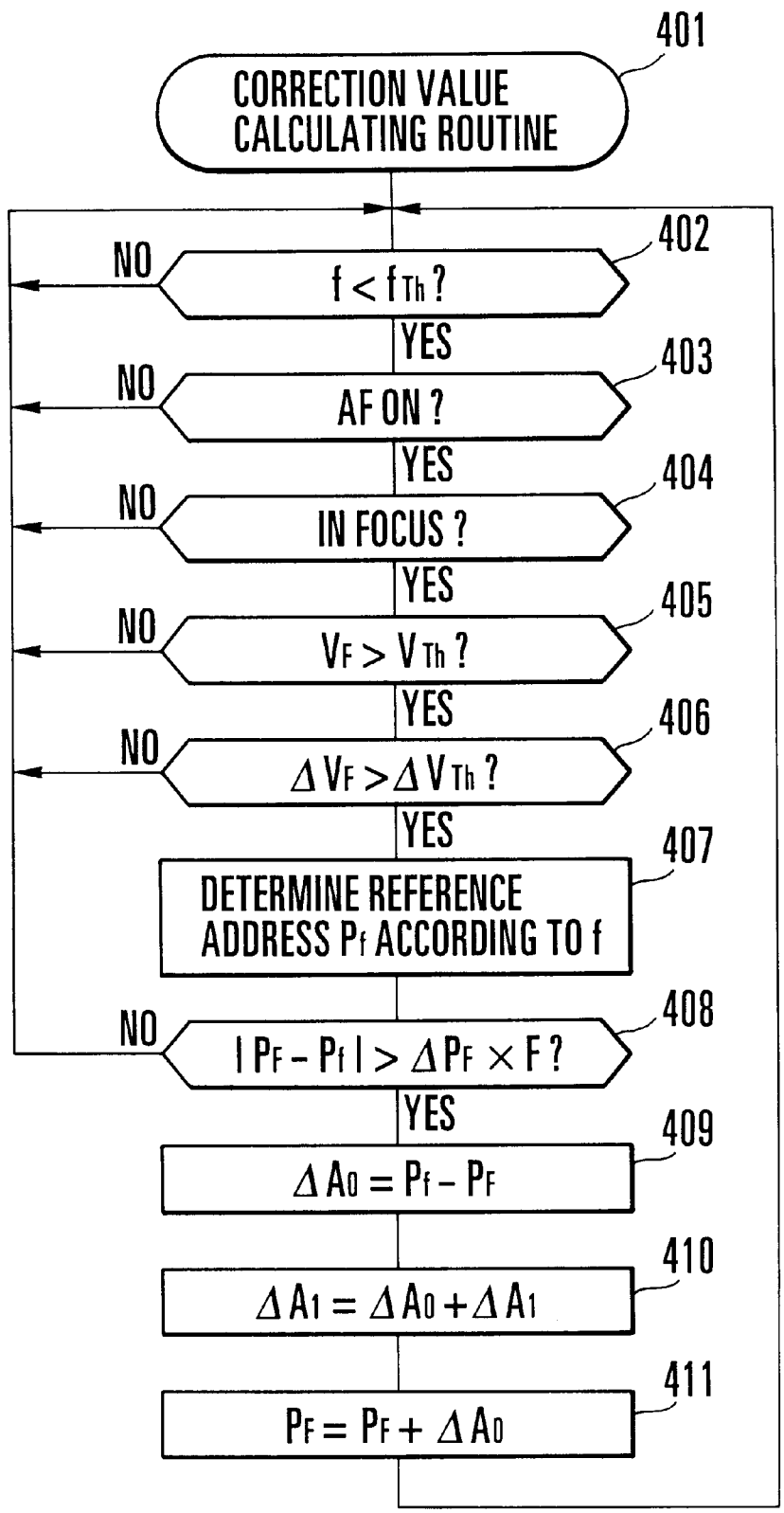
FIG. 4 is a flowchart showing the operation of the first embodiment.

Although not shown in the flowchart of FIG. 4, other steps may also be added; for example, the correction may not be performed until the total correction value $\Delta A_1$ exceeds a predetermined amount of correction, or if the total correction value $\Delta A_1$ exceeds the predetermined amount of correction, the difference therebetween may be calculated. These steps are intended to prevent a moving frame from mechanically colliding against an end portion when the correction value is excessively large, because the movable range of each of the lens groups is shifted according to the correction. If the difference is calculated, an address which specifies the position of the end portion is shifted by that difference.

(Second Embodiment)

The first embodiment is suited to a subject-distance range of approximately 80 cm to infinity, but tends to provide an erroneous correction value in the case of a close subject distance such as 10 cm or 20 cm. For example, referring to FIG. 20, even if a focus deviation due to a temperature variation does not actually occur, if a subject lying at a distance of 10 cm is brought into focus, a correction value C which leads to an erroneous correction will be obtained.

In view of this point, a second embodiment is intended to perform "superimposition" with respect to a temperature condition which causes rear focus for the same address at normal temperature within an operating temperature range such as that corresponding to −5° C. in FIG. 20. Specifically, referring to FIG. 20, if B=40 pulses, reset address 500 specified by an adjustment at 20° C. is shifted by −40 pulses to obtain address 460 which is to be used as a reset address at the time of start-up. Since an operating temperature range or a temperature range which can guarantee the required performance is −5° C. to 45° C., the correction value necessarily becomes a value with the plus sign. In the case shown in FIG. 20, for example, if a start-up operation is performed with reset address 460 at an environmental temperature of 20° C., the correction value is +D for a subject distance of 10 cm, and +B for a practical subject distance. If B=20 pulses, no sufficient correction is obtained, but since the reset address becomes 480, a correction value of +40 can be used to change the reset address to 500, whereby the position of the focusing lens 114 can be perfectly corrected. In this case, by neglecting any calculation result other than correction values with the plus sign, it is possible to ensure the accuracy of the correction.

As is apparent from the above description, the advantage of the second embodiment resides in the fact that since a limit of the operating temperature range (in the above-described example, a minimum value) is used as a reference, the address obtained when a subject lying at a practical distance is in focus becomes a value of address 100 or less (a correction value with the plus sign) in the aforesaid example corresponding to a subject distance of ultra-infinity, irrespective of the magnitude of a temperature variation which is an operating environmental condition, whereby it is possible to prevent erroneous setting of a subject distance.

Figure 5:
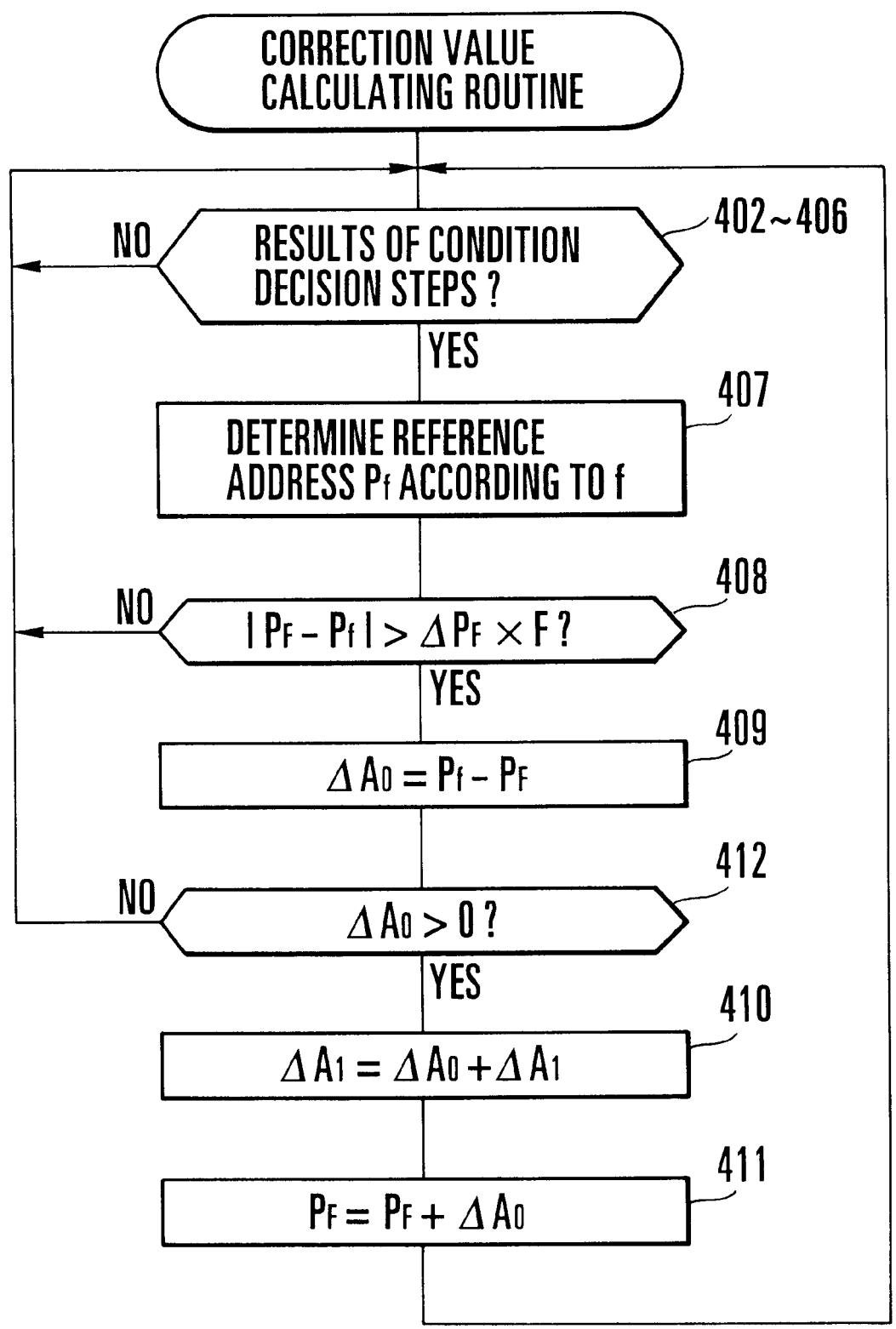
FIG. 5 is a flowchart showing the operation of a second embodiment of the present invention.

FIG. 5 shows a correction value calculating routine according to the second embodiment, and steps denoted by reference numerals identical to those used in FIG. 4 have contents identical to those of the corresponding steps shown in FIG. 4. In the flowchart of FIG. 5, it is assumed that the reset address at the time of start-up is assigned address 460 in the aforesaid example shown in FIG. 20. Step 412 is added between Steps 409 and 410, and only a correction value with the plus sign is used.

(Third Embodiment)

The second embodiment discloses the method of setting a reset address which necessarily causes an in-focus position to be located on an ultra-infinity side with respect to an address which enables a subject lying at infinity to be brought into focus when the power source is turned on, in order not to use a calculation result based on an inappropriate subject distance as a subject distance condition required to calculate a correction value, A third embodiment of the present invention is intended for a camera apparatus such as a video camera having an image-shake correction function arranged to measure the amount of vibration by means of a detection system such as a vibration gyro, and offers the art of carrying out the present invention in a video camera, a still video camera or the like which includes a camera processing circuit capable of detecting motion vectors by comparing images of successive fields.

Figure 6:
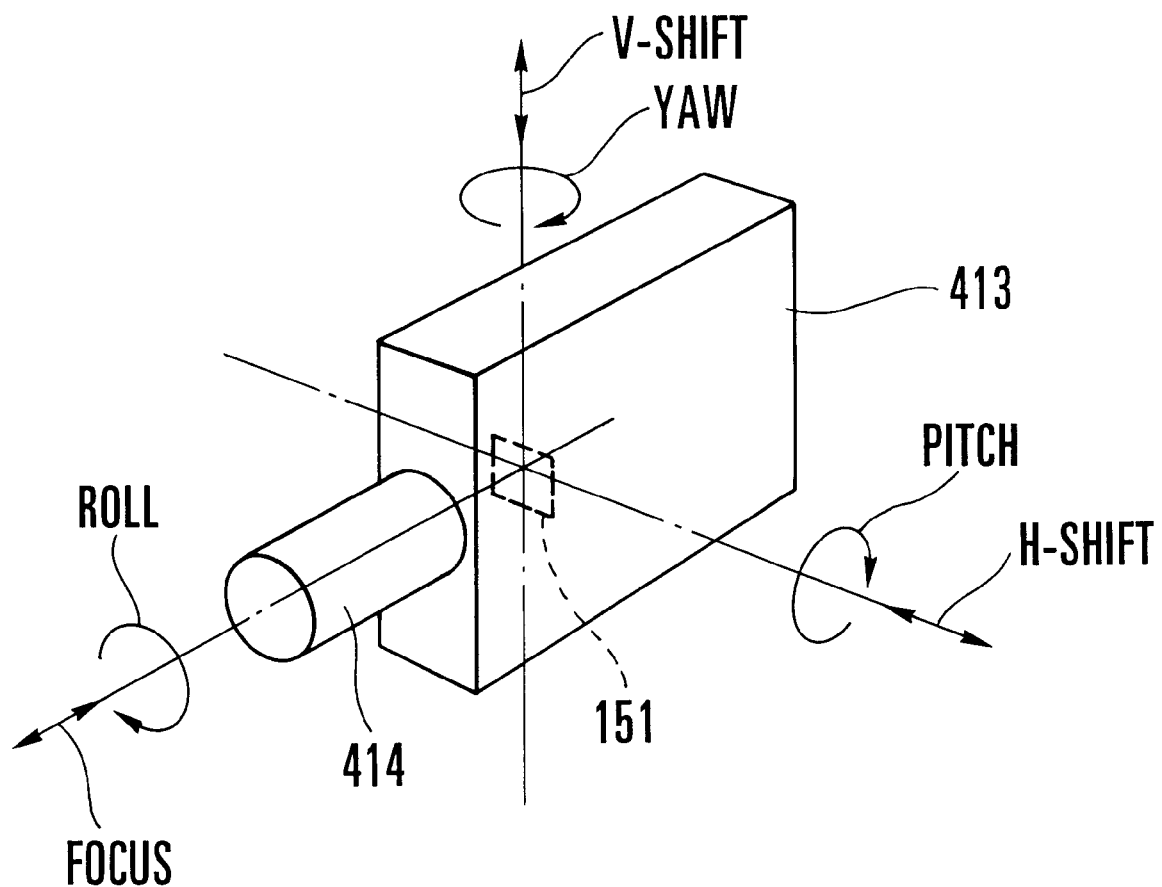
FIG. 6 is an explanatory view of a video camera having an image-shake correction function according to a third embodiment of the present invention.

FIG. 6 shows the motions of a camera which includes a video camera 413, a lens part 414 and a CCD 151. As shown in FIG. 6, the camera generally moves in parallel with or rotates about any of three axes, one of which extends in the direction of the optical axis of the camera and two of which extend in the horizontal and vertical directions, respectively, in a plane perpendicular to the direction of the optical axis. All the motions are obtained in the form of the combination of such motional components.

In general, image-shake correcting means is arranged to eliminate (correct) rotational components indicated at PITCH and YAW. A motion in the direction indicated by a double-headed arrow FOCUS is corrected by an AF device, and a motion in the direction indicated by an arrow ROLL is said to be sufficiently suppressible by the holding ability of a human. In many cases, a shift in either of the two directions indicated by double-headed arrows V-Shift and H-Shift merely produces a negligeable level of motion on an image plane in the case of a subject distance farther than a general subject distance of several meters, although the level of motion depends on the focal length of the lens part 414. However, as a subject is located at a closer distance, the influence of a focus deviation due to such a shift becomes larger. In the third embodiment, a comparison is made between successive field images which are obtained when the image-shake correction function is on, and the absolute value of the resultant motion vector (the amount of an image shake) is used to detect an approximate subject distance. If it is determined that the detected subject distance is a close subject distance inappropriate for the measurement of the amount of focus deviation, no correction is performed.

Figure 7:
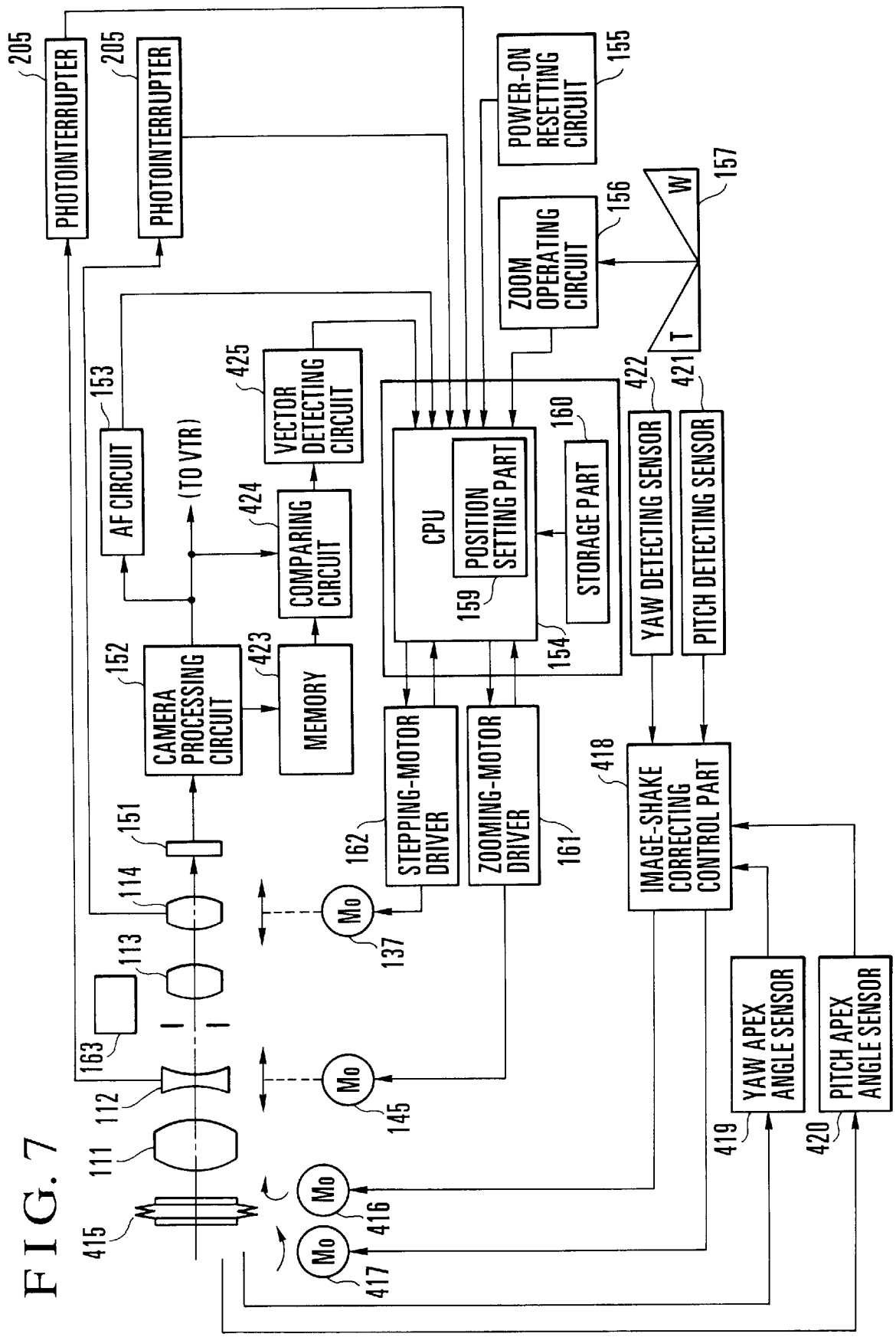
FIG. 7 is a block diagram of a video camera according to the third embodiment of the present invention.

FIG. 7 is a block diagram of the third embodiment. In FIG. 7, blocks denoted by reference numerals identical to those used in FIG. 1 have functions identical to those of the corresponding blocks shown in FIG. 1. Blocks 415 to 422 constitute the image-shake correction function. The block 415 is a variable angle prism which is disposed forwardly of a zoom lens optical system (111 to 114) and has a liquid-filled interior enclosed by two front and rear glass plates and an expansible bellows and whose apex angle can be varied. The blocks 416 and 417 constitute driving actuators for varying the apex angle of the variable angle prism 415, and are arranged to vary the apex angle of the variable angle prism 415 about rotational axes which 90° differ from each other, respectively, so that a light beam can be bent in a desired direction. The blocks 419 and 420 are sensors for detecting the apex angle of the variable angle prism 415, and the block 418 is an image-shake correction control part. The above-described arrangement provides feedback control on the apex angle of the variable angle prism 415. The image-shake correction control part 418 determines the value of a target apex angle on the basis of the detection results provided by a PITCH detecting sensor 421 and a YAW detecting sensor 422 for detecting the respective rotations of the entire camera in the PITCH and YAW directions. The PITCH detecting sensor 421 and the YAW detecting sensor 422 may be, for example, well-known angular velocity sensors.

When an image of a subject is formed on the CCD 151, the CCD 151 outputs a video image. The video image is converted into a predetermined video image signal by a camera processing circuit 512, and the predetermined video image signal is stored in a memory 423 and is also supplied to a comparing circuit 424. The comparing circuit 424 compares an video image of the last field with a video image of the immediately previous field, and a vector detecting circuit 425 detects the residual amount of an image shake from the output of the comparing circuit 424. The detection result of the vector detecting circuit 425 is inputted into the CPU 154.

The CPU 154 uses a correction value calculating routine in which the step of comparing the absolute amount of the motion vector obtained in the vector detecting circuit 425 with a predetermined amount is added to the condition decision steps 402 to 406 of calculating the correction value in the flowchart of FIG. 4. The CPU 154 is arranged to avoid calculating the correction value if such absolute amount is equal to or greater than the predetermined value.

In the above-described manner, the CPU 154 determines that the accuracy of the correction value is low, from the relationship of "although the image-shake correction function is working, the residual amount of an image shake is large (a vector quantity is greater than a threshold)"→"the influence of a shift shake is large"→"the current photographing distance is the closest photographing distance". In accordance with such decision, even if the current photographing distance is actually not the closest photographing distance, it is possible to avoid calculating a correction value during a large vibration status (for example, the state in which the holding of the camera is insufficient or photography is being performed on a vehicle or a ship) which causes an image shake incapable of being completely eliminated even when the image-shake correction function is operating. Accordingly, it is possible to obtain a more accurate correction value under a far stabler status.

(Fourth Embodiment)

Each of the above-described second and third embodiments is intended to cope with the problem that although an accurate correction value can be obtained with respect to a subject distance of 80 cm to infinity from the calculation of a correction value that constitutes a main feature of the present invention, the calculation lacks accuracy with respect to a closer photographing distance. A fourth embodiment is also intended to achieve a similar effect, and is arranged so that a photographer operates a macroswitch to select the operation of photographing a subject lying at a distance farther than 80 cm or the operation of photographing a subject lying at a closer distance (macrophotography). Only when the photographer selects a general photography status (the operation of photographing a subject lying at a distance farther than 80 cm), the fourth embodiment executes an operation identical to that of the first embodiment.

Figure 8:
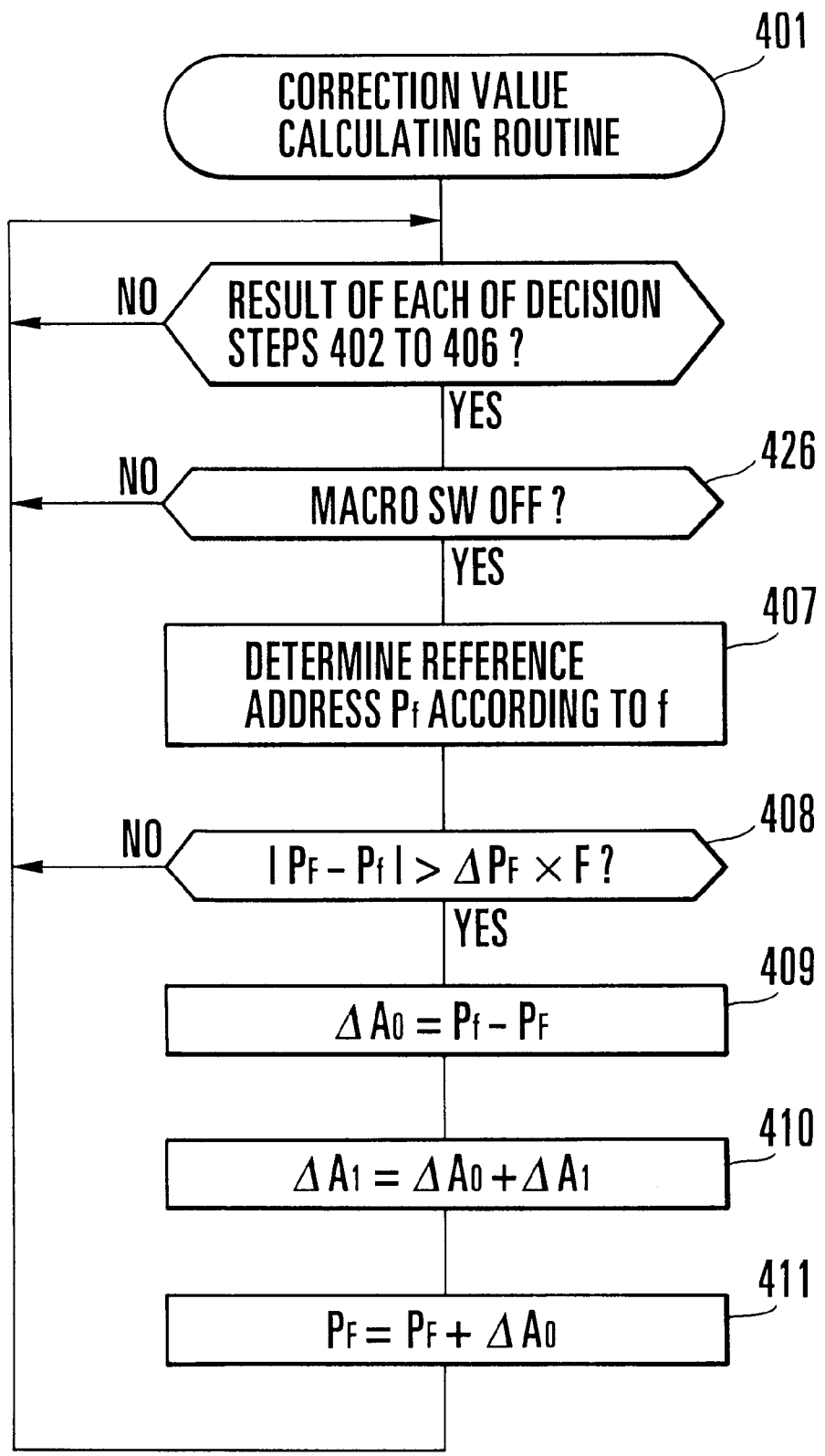
FIG. 8 is a flowchart showing the operation of a fourth embodiment of the present invention.

For this purpose, the arrangement shown in the block diagram of FIG. 1 needs only to be modified so that information from the macroswitch can be inputted into the CPU 154. As shown in FIG. 8, the flowchart of a correction value calculating routine according to the fourth embodiment differs from that shown in FIG. 4, only in that Step 426 for determining the state of the macroswitch is newly inserted in the routine shown in FIG. 4. In FIG. 8, steps denoted by reference numerals identical to those used in FIG. 4 have processing contents identical to those of the corresponding steps shown in FIG. 4.

(Fifth Embodiment)

The above description of each of the first to fourth embodiments has disclosed a method which does not need to use a temperature detecting sensor in correcting a focus deviation due to a temperature variation. Accordingly, any of the first to fourth embodiments is capable of reducing the size, the weight and the cost of an apparatus which uses a lens system arranged in the above-described manner.

A fifth embodiment of the present invention is intended to provide an arrangement which makes an approximate correction on the basis of the detection result of a correcting circuit having a temperature sensor and then makes fine adjustment of the result of the approximate correction by using an in-focus address assigned to a focusing lens with respect to a predetermined focal length, which in-focus address constitutes a feature of the present invention. The fifth embodiment is intended to correct a focus deviation which cannot be completely eliminated by a conventional temperature compensating circuit because of the presence of various dispersion factors such as the dispersion of the output gain of the temperature sensor itself, the state in which the temperature of a lens system differs among various portions thereof even if the temperature measured at a position where the temperature sensor is disposed is the same (even if the output value of the temperature sensor is the same), and the dispersion of the amount of focus deviation for the same temperature variation, which dispersion depends on differences between individual lens systems. Further, the fifth embodiment is capable of correcting a focus deviation due to factors other than temperature, such as absorption of moisture, thereby achieving a far higher-precision focus correction.

For example, in the case of the lens system which has different focus deviation characteristics represented by a plurality of different average values for different temperatures such as those shown in FIG. 20, a focus deviation of 0.3 mm occurs for a temperature variation of 25° C. However, since the depth of field is 0.02–0.03 mm on each of its front- and rear-focus sides, if the dispersion of the amount of focus deviation exceeds 10% in total, a focus deviation which exceeds the depth of field may remain even after the completion of a correction. (For example, defocus which exceeds the depth of field occurs if zooming toward the wide-angle end is performed after a subject has been brought into focus by manual focusing at the telephoto end.)

Figure 9:
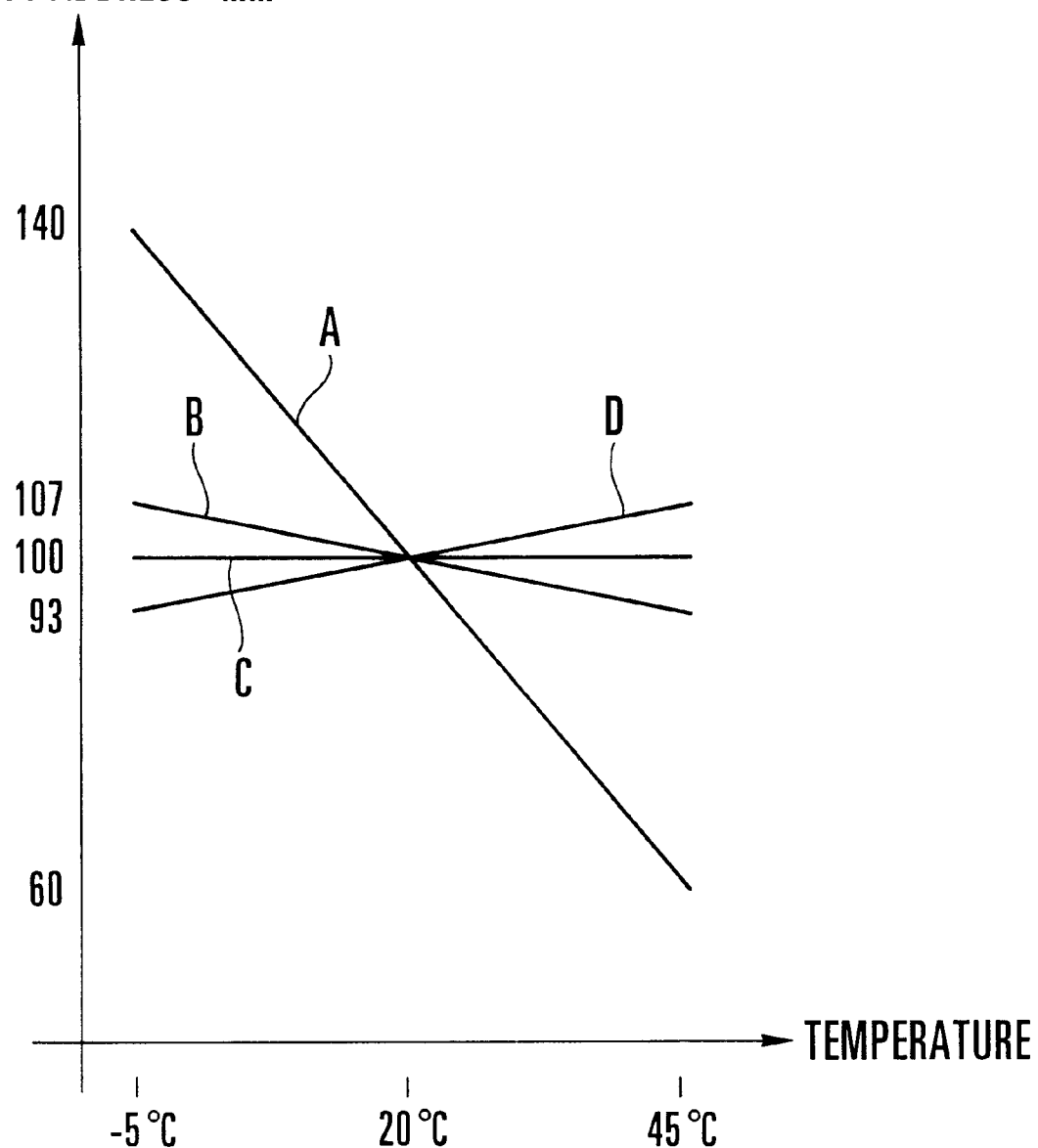
FIG. 9 is an explanatory view showing the relation between temperature variation and focus deviation.

The above-described state will be described below with reference to FIG. 9. In FIG. 9, the vertical and horizontal axes represent address and temperature, respectively, and a line A represents a variation in an in-focus address for wide-angle end at infinity which occurs when a focus deviation due to a temperature variation is not at all corrected. The line A passes through a point of address 100 at 20° C., a point of address 140 at –5° C., and a point of address 60 at +45° C.

A line B represents one example of a correction using a detection result of the temperature sensor. If a 100% correction is effected, the line B assumes an ideal state C in which the line B passes through points of address 100 over the operating temperature range of –5° C. to +45° C. However, as shown by the line B, a perfect correction is actually impossible to realize and an correction error occurs. In the example shown in FIG. 9, the line B exhibits an error for 7 pulses with respect to a temperature variation of 25° C., i.e., the line B passes through a point of address 107 at –5° C. and a point of address 93 at +45° C. This error for 7 pulses can be corrected by using a flowchart such as that used in the first embodiment.

Figure 10:
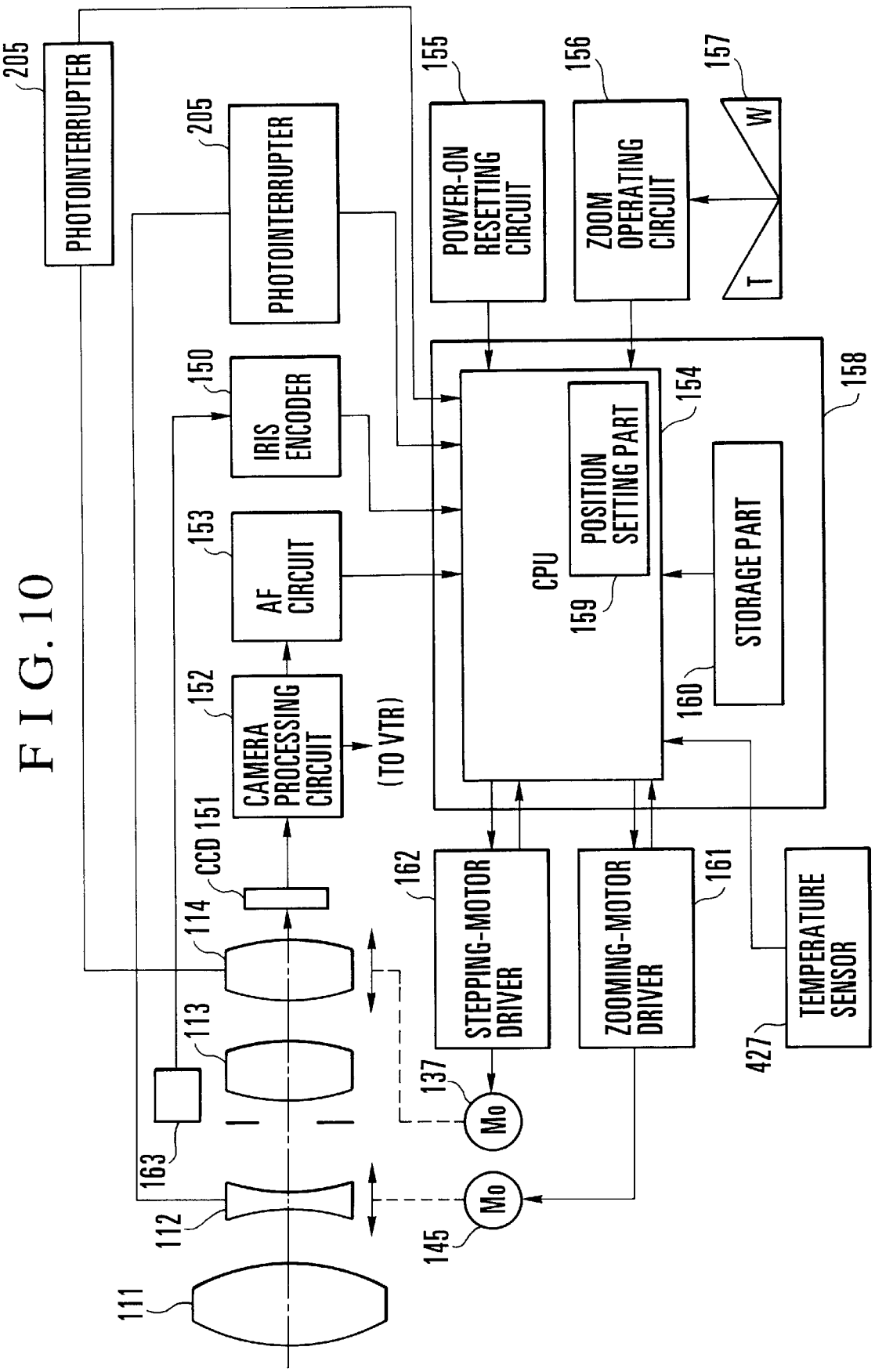
FIG. 10 is a block diagram of a video camera according to a fifth embodiment of the present invention.

FIG. 10 is a block diagram of an arrangement according to the fifth embodiment, in which the output of a temperature sensor 427 is inputted to the CPU 154.

If such in-focus address is corrected in accordance with the average value of dispersions such as the dispersion of the output of the temperature sensor 427, the dispersion of the focusing characteristics of each individual lens due to temperature, and the dispersion of temperature distribution in a lens unit, the characteristic of an actual product is plotted as an intermediate line between the line B and the line D in FIG. 9. For example, if the focusing lens assumes the characteristic indicated by the line B at –5° C., a subject lying at a distance of approximately 80 cm to infinity can be brought into focus at address 107, whereas if the focusing lens assumes the characteristic indicated by the line D at –5° C., the subject lying at a distance of approximately 80 cm to infinity can be brought into focus at address 93, and a subject lying at a closest distance of, for example, 20 cm is brought into focus at address 107. Accordingly, the characteristic indicated by the line B may be corrected in the way of modifying address 107 into address 100, but if the characteristic indicated by the line C is corrected with the subject being focused at address 107, an erroneous correction occurs for the line C.

Figure 21:
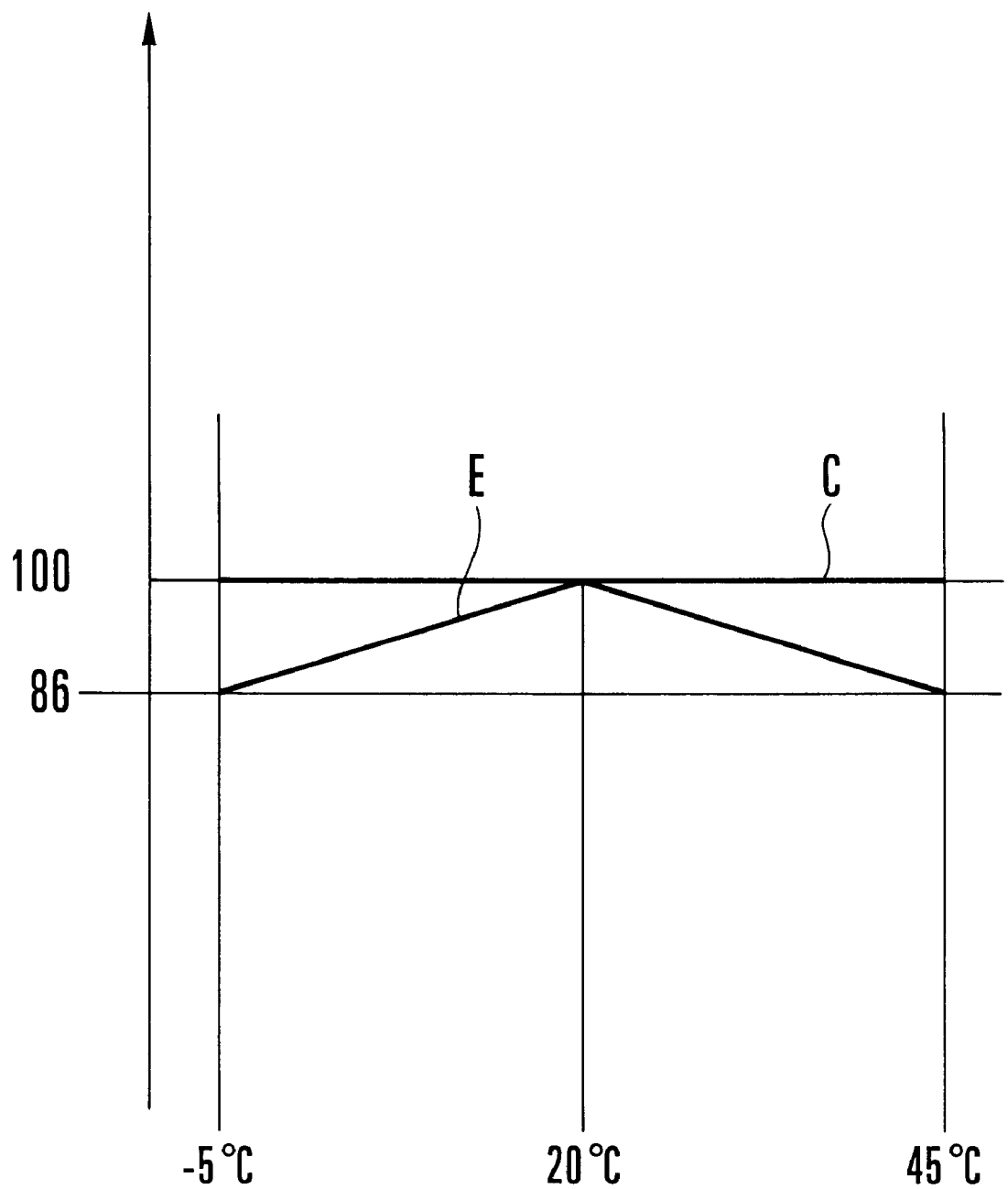
FIG. 21 is an explanatory view showing the relation between temperature and position deviation.
Figure 22:
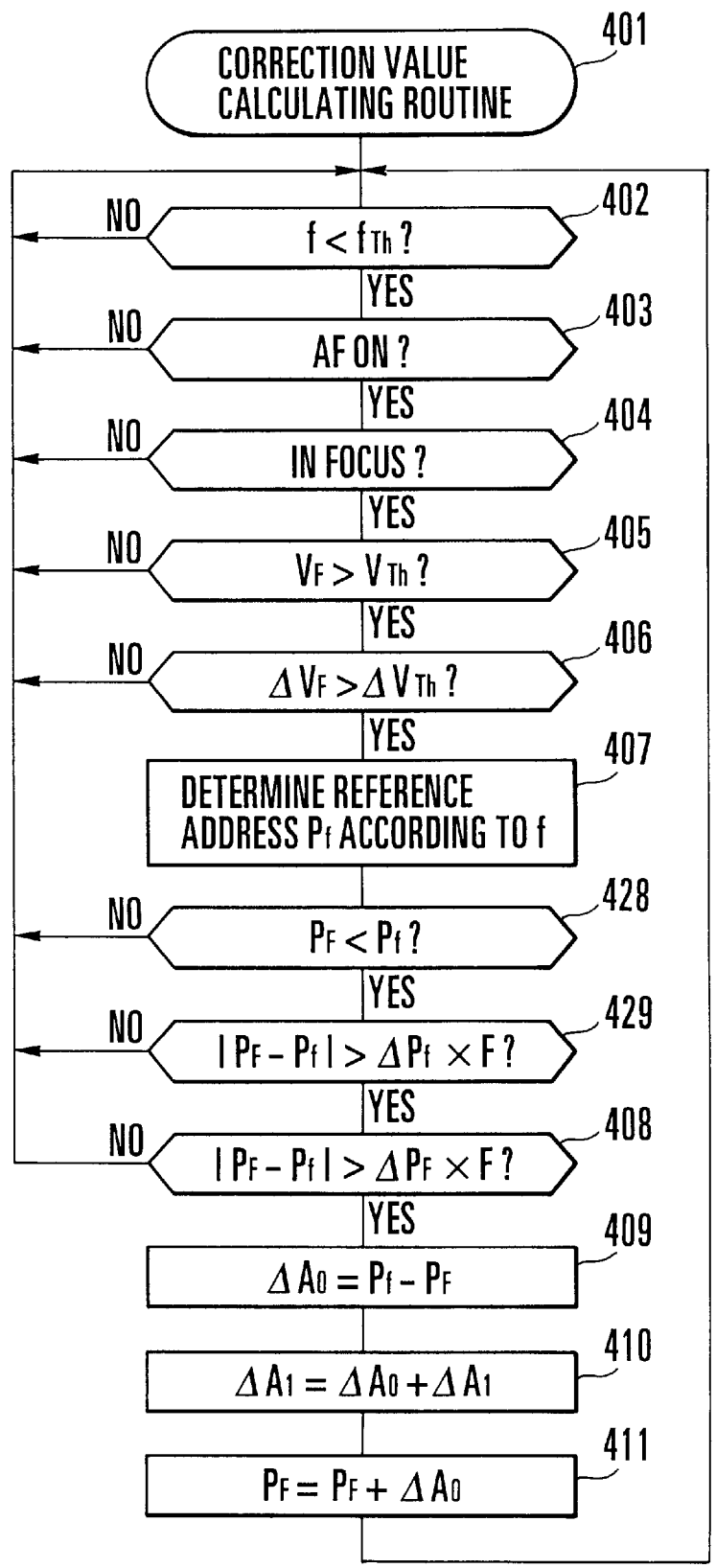
FIG. 22 is a flowchart showing the operation of the fifth embodiment of the present invention.

To solve this problem, as indicated by a line E in FIG. 21, the line C may be biased so that the correction error of temperature correction remains by an amount corresponding to an address smaller than the predetermined address 100. In this case, by correcting the position of the focusing lens only when the focusing lens comes into focus at an address smaller than address 100, it is possible to prevent an erroneous correction due to the aforesaid subject distance. (In this example, the in-focus address increases from infinity to the closest distance, but in the opposite case, the line C is biased so that the correction error of temperature correction remains by an amount corresponding to an address larger than the predetermined address 100.) FIG. 22 is a flowchart of the above-described operation. (Incidentally, it is assumed that in a stage preceding this flowchart, the correction shown in FIG. 21 is performed on the basis of the output result of the temperature sensor 427.)

Steps 401 to 407 are identical to those shown in FIG. 4. In Step 428, it is determined that $P_F$ (the current address) is smaller than $P_f$ (an address which allows a subject lying at a distance of approximately 80 cm to infinity to be brought into focus for the current focal length f). In the example shown in FIG. 21, since the current address $P_F$ is 100, the address $P_f$ is approximately 86 to 100 for a subject distance of 80 cm to infinity. If the current address $P_F$ is smaller than the address $P_f$, the process proceeds to Step 429, in which it is determined whether a correction needs to be executed, while taking the depth of field into account. If the answer is Y, Steps 408 to 411 which are identical to those shown in FIG. 4 are executed.

Incidentally, in each of the above-described embodiments, a correction value is obtained by modifying a reset address and a correction is performed with the correction value. However, it is possible to adopt any other method that can provide equivalent effects, for example, a method of reading position information relative to the variator lens and the focusing lens from a storage part which stores position information for a plurality of subject distances, and correcting (shifting) the read position information relative to the variator lens and the focusing lens.

(Sixth Embodiment)

Although each of the first to fifth embodiments includes a reset switch such as a photointerrupter for a focusing lens, the sixth embodiment is intended to provide a far simpler correction method by excluding a reset switch such as a photointerrupter.

In each of the first to fifth embodiments, when a power source is turned on, the focusing lens is moved to a reset position detected by the reset switch, and after the reset position has been assigned a reset address and an actual photographing operation has been started, a correction value is found only when photographing conditions conform to predetermined conditions and a focus deviation due to a variation in a temperature environment and the like is corrected with the correction value.

However, if the position of the focusing lens which is brought in focus for a predetermined subject distance by an autofocus device when a variator lens is at or near a wide-angle end is to be assigned a predetermined address, it is also preferable to adopt a method of moving the variator lens to the wide-angle end on the basis of a reset position after the power source has been turned on, and bringing the focusing lens into focus at the predetermined subject distance.

Such predetermined subject distance is, as described previously, generally 80 cm to infinity in the case of a video camera using a ¼-inch-size CCD, but since the current technical trend is a further reduction in the size of CCDs, the range of the predetermined subject distance is expected to increase. Accordingly, the aforesaid method can be carried out with almost no problem.

Furthermore, the method according to the sixth embodiment is preferable to the previously-described address determining method using a conventional reset switch, in the case of a camera such as a surveillance camera installed at a cash dispenser corner or a pinball saloon, i.e., in the case where a camera is installed at a predetermined place and a subject distance is within a predetermined range such as the aforesaid one as well as a subject is clear and has (or can prepare) a contrast condition which allows an autofocus device to detect an in-focus position of a focusing lens, or under a condition such as a condition which requires an actual operating time to continue for a long time after a power source has been turned on, or which causes an environmental temperature variation.

Figure 23:
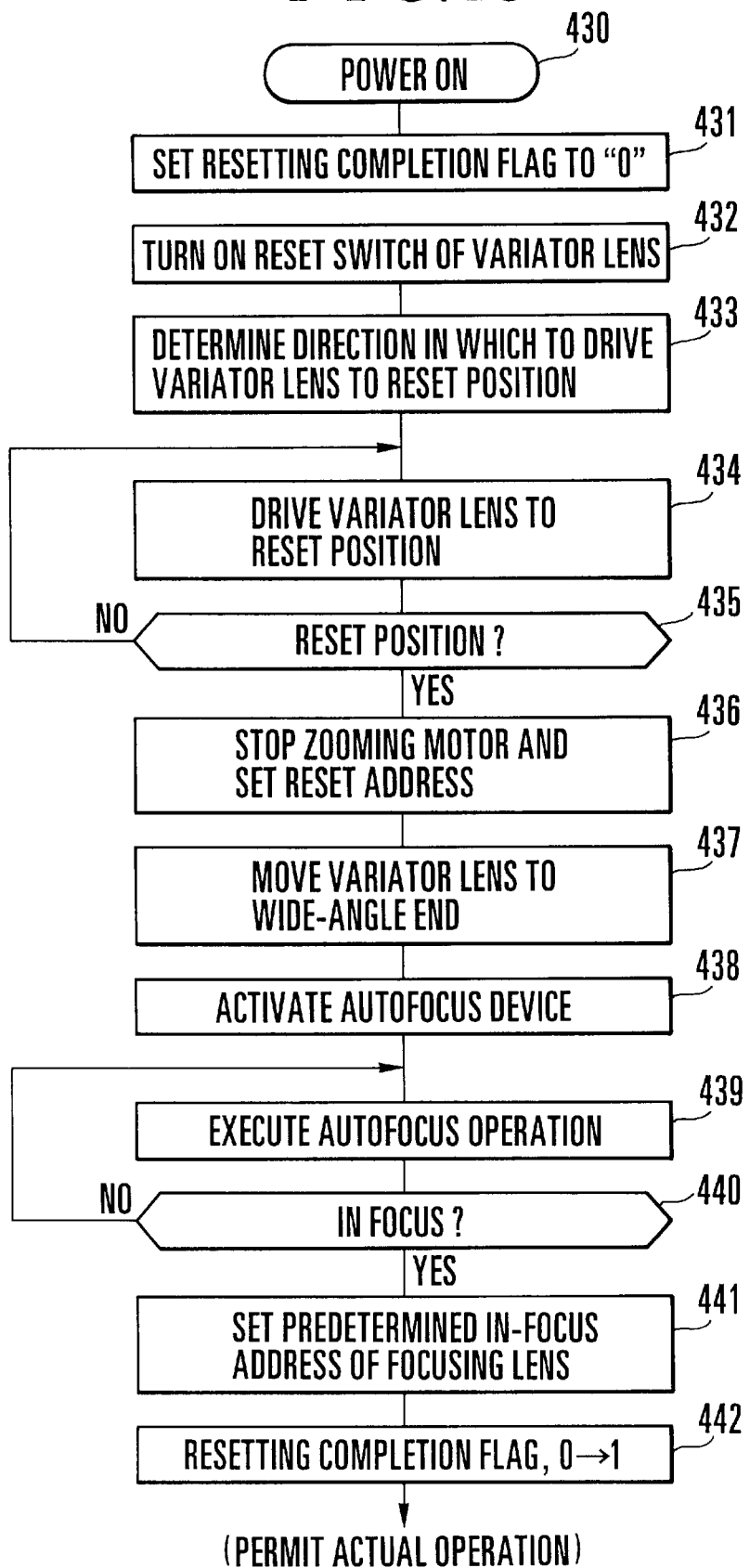
FIG. 23 is a flowchart showing the operation of a sixth embodiment of the present invention.

FIG. 23 is a flowchart of a resetting operation according to the sixth embodiment. In Step 430, when the power source of an apparatus (such as a video camera) is turned on, the process proceeds to Step 431. In Step 431, the value of a resetting completion flag is set to "0". While the value of the resetting completion flag is "0", an actual operation of the apparatus (for example, a zooming or recording operation of the video camera) is not performed. In Step 432, a reset switch for a variator lens is actuated. If the reset switch is the aforesaid type of photointerrupter, an iRED (infrared-emitting diode) is turned on and a detecting circuit for a photosensitive diode are actuated. Then, in Step 433, it is determined whether the output of the photosensitive diode exceeds the threshold Th shown in FIG. 17, and a direction in which to drive a zooming motor for moving a variator lens to a reset position is determined on the basis of the decision result. In Step 434, the zooming motor is driven in the direction determined.

In Step 435, it is determined whether the variator lens has reached the reset position. If it is determined that the variator lens has reached the reset position, the zooming motor is stopped and the reset position is assigned a predetermined reset address. Subsequently, pulses inputted to the zooming motor (pulse motor) are continuously counted from the predetermined reset address to grasp the absolute position of the variator lens.

In Step 437, the variator lens is moved to a wide-angle-end position from the absolute position. Then, an autofocus device is activated in Step 438, and an autofocus operation is performed on the basis of a predetermined decision in Step 439. Specifically, a focusing lens is moved to a position at which the contrast signal of a video signal reaches its peak. In Step 440, it is determined whether an in-focus position has been obtained. If it is determined that the in-focus position has been obtained, the process proceeds to Step 441, in which, for example, address 100 is set. Then, in Step 442, a value corresponding to the number of pulses inputted to a stepping motor is subtracted from address 100, and the value of the resetting completion flag is set from "0" to "1", thereby enabling the apparatus to perform an actual operation.

Incidentally, if a correction similar to that described previously in connection with the first embodiment is continuously performed after the above-described resetting process is completed immediately after the power-on operation, it is possible to cope with a focus deviation due to a characteristic variation with time after the power-on operation.

(Seventh Embodiment)

A seventh embodiment of the present invention has an arrangement which allows a photographer to issue an instruction which specifies whether to execute a correction using a calculated correction value.

For example, in a camera lens for a business-use camera such as a lens-interchangeable type of camera for gathering news materials which uses a front focusing type of lens system which performs focusing by means of the front lens group, an image-forming lens group called a relay lens is disposed to be able to be adjusted in position in the direction of its optical axis so that a user can correct a focus deviation due to a temperature variation, deviations of the flange back lengths of individual cameras, and the like. Accordingly, a skilled person can adjust such focus deviation on the basis of a predetermined procedure.

The seventh embodiment is intended for a rear focusing lens system, and does not have a mechanism for adjusting the position of its first lens group in the direction of the optical axis and, therefore, is not suited to the adjustment of the business-use camera lens. However, a photographer is allowed to determine whether to execute calculation of a correction value, so that a calculation error of a correction value due to subject distance is eliminated from the automatic correction described above in connection with each of the aforesaid embodiments.

To calculate a correction value in the manner described above in correction with each of the aforesaid embodiments, it is necessary to satisfy, for example, three conditions: (i) the focal length is set to a wide-angle end; (ii) the subject distance is farther than a predetermined distance; and (iii) a subject is in focus. In the seventh embodiment, a correcting operation is performed when the photographer determines that all the conditions (i), (ii) and (iii) are satisfied, and presses a correcting button or the like.

Figure 24:
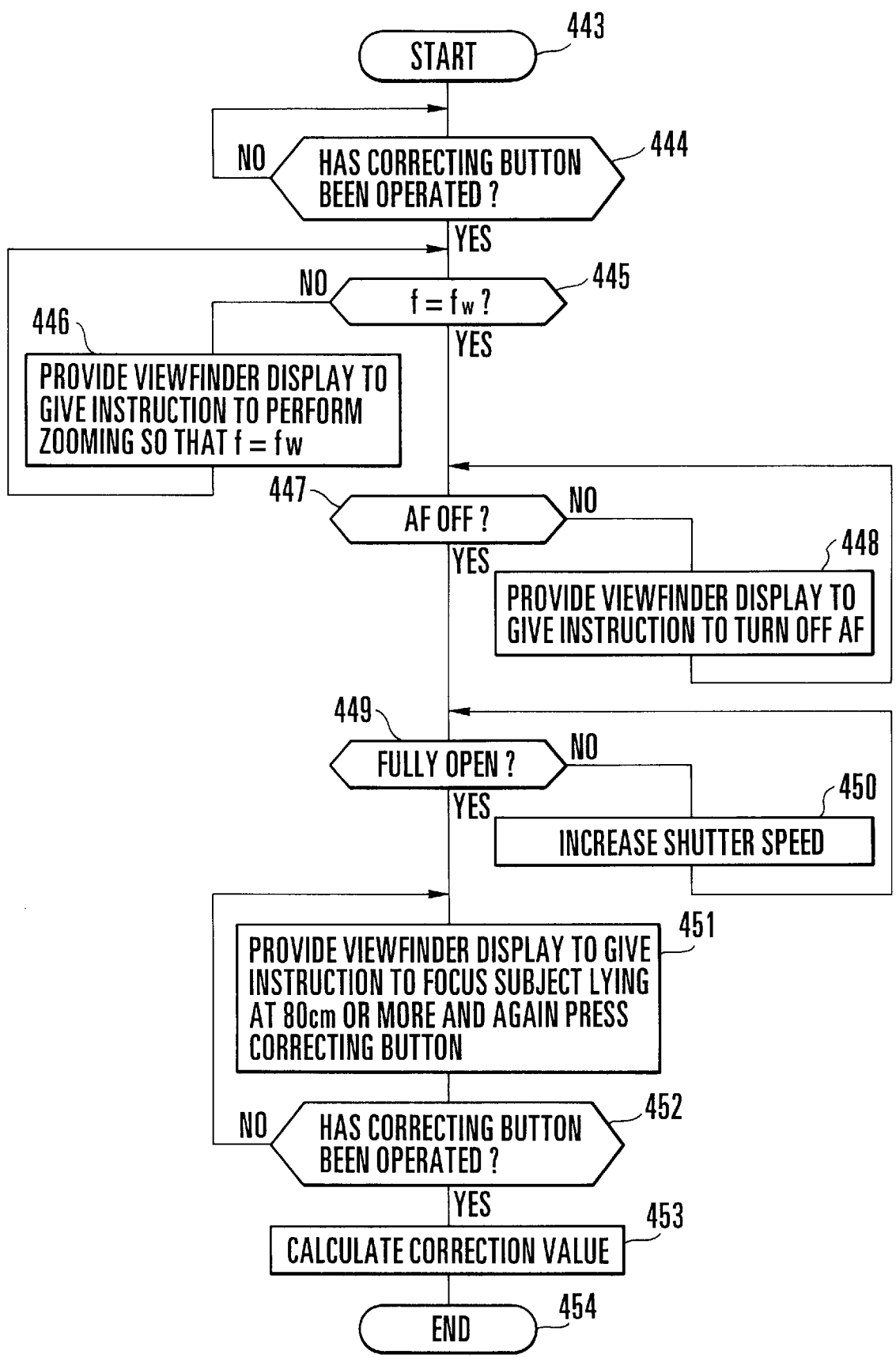
FIG. 24 is a flowchart showing the operation of a seventh embodiment of the present invention.

Otherwise, it is preferable to adopt another arrangement in which when the photographer presses the correcting button, the conditions (i), (ii) and (iii) are checked to complete a correction. FIG. 24 is a flowchart which performs calculation of a correction value while allowing the photographer to confirm the process of the calculation in a viewfinder display. Incidentally, the function of the viewfinder display may be replaced with a liquid crystal display part or a sound warning part which is incorporated in a camera.

In Step 443, the process is started, and in Step 444, it is determined whether the correcting button has been operated. If it is determined that the correcting button has been operated, the process proceeds to Step 445, in which the setting of the focal length f is a wide-angle setting which is a condition needed to execute calculation of a correction value. If the condition is not satisfied, the process proceeds to Step 446, in which the operator, through the viewfinder display, is instructed to set the focal length f to a focal length $f_W$ needed to execute calculation of a correction value. If the focal length f is equal to the focal length $f_W$, the process proceeds to Step 447, in which it is determined whether an AF device is off. If the AF device is on, the process proceeds to Step 448, in which the viewfinder or the like is made to display an instruction to turn off the AF device. Incidentally, Steps 447 and 448 are incorporated in this flowchart on the assumption that the photographer turns off the AF device and performs a manual focusing operation, but Steps 447 and 448 may also be replaced with the step of performing a focusing operation using the AF device. If it is determined in Step 447 that the AF device has been turned off, the process proceeds to Steps 449 and 450, in which the charge storage time (shutter speed) of a CCD is changed to select a fully open aperture value.

By selecting the fully open aperture value and shallowing the depth of field, it is possible to increase the accuracy of calculation of a correction value. In Step 451, the viewfinder display is made to instruct the photographer to execute an operation for calculating a correction value. For example, the viewfinder display displays an instruction to focus a subject lying at a distance farther than 80 cm and then press the correcting button.

Then, in Step 452, it is determined whether the correcting button has been operated, whereby a check is made as to whether the photographer has executed an operation based on the instruction. If the operation of the correcting button is detected in Step 452, the process proceeds to Step 453, in which a correction value is calculated. The correction value is calculated by processing similar to Steps 409 to 411 shown in FIG. 4.

(Eighth Embodiment)

An eighth embodiment is intended to provide a method of interlocking the timing of clearing a correction value calculated by the method described above in correction with any of the first to seventh embodiments, with the power-off operation of a photographing apparatus. For example, a typical video camera has a main power source switch which can be selectively switched from its OFF position to a camera side and a VTR side, and is arranged to cause a user to select a REC (recording) mode or a REC PAUSE (pause in recording) mode through a trigger switch after selecting the camera side.

For example, while the power source switch is switched to the camera side, the calculation of a correction value is continued irrespective of whether the REC mode or the REC PAUSE mode is selected, and if the power source switch is turned off or switched to the VTR side, the correction value continuously calculated is cleared.

Otherwise, it is preferable to adopt a method of counting time which elapses after the power source switch has been turned off or switched to the VTR side, and clearing such correction value after the elapse of a predetermined time.

(Ninth Embodiment)

A ninth embodiment is intended for a case in which after the power source has been turned on, the result of the decision made in any of Steps 402 to 406 becomes N (NO) and it becomes impossible to perform the calculation of a correction value, such as that shown in FIG. 4.

For example, in the flowchart shown in FIG. 23, since the calculation of a correction value and the resetting operation are performed as a series of operations, an actual operation for photography is not permitted until such series of operations is completed and the value of the resetting completion flag is set to "1".

However, the resetting operation shown in FIG. 4 has the problem that if the result of the decision made in any of Steps 402 to 406 becomes N, there may be a case in which an actual operation for photography is not permitted and photography is not at all performed.

To cope with this problem, the ninth embodiment is arranged so that the value written in the E$^2$PROM during an initial adjustment is used as a reset address immediately after the power source has been turned on, and an actual operation is performed on the basis of the reset address until a correction value is calculated.

(Tenth Embodiment)

As described previously, an inner focus type of zoom lens is arranged to maintain an in-focus state during zooming by moving a variator lens and a focusing lens along zoom tracking curves stored in a memory.

Figure 2:
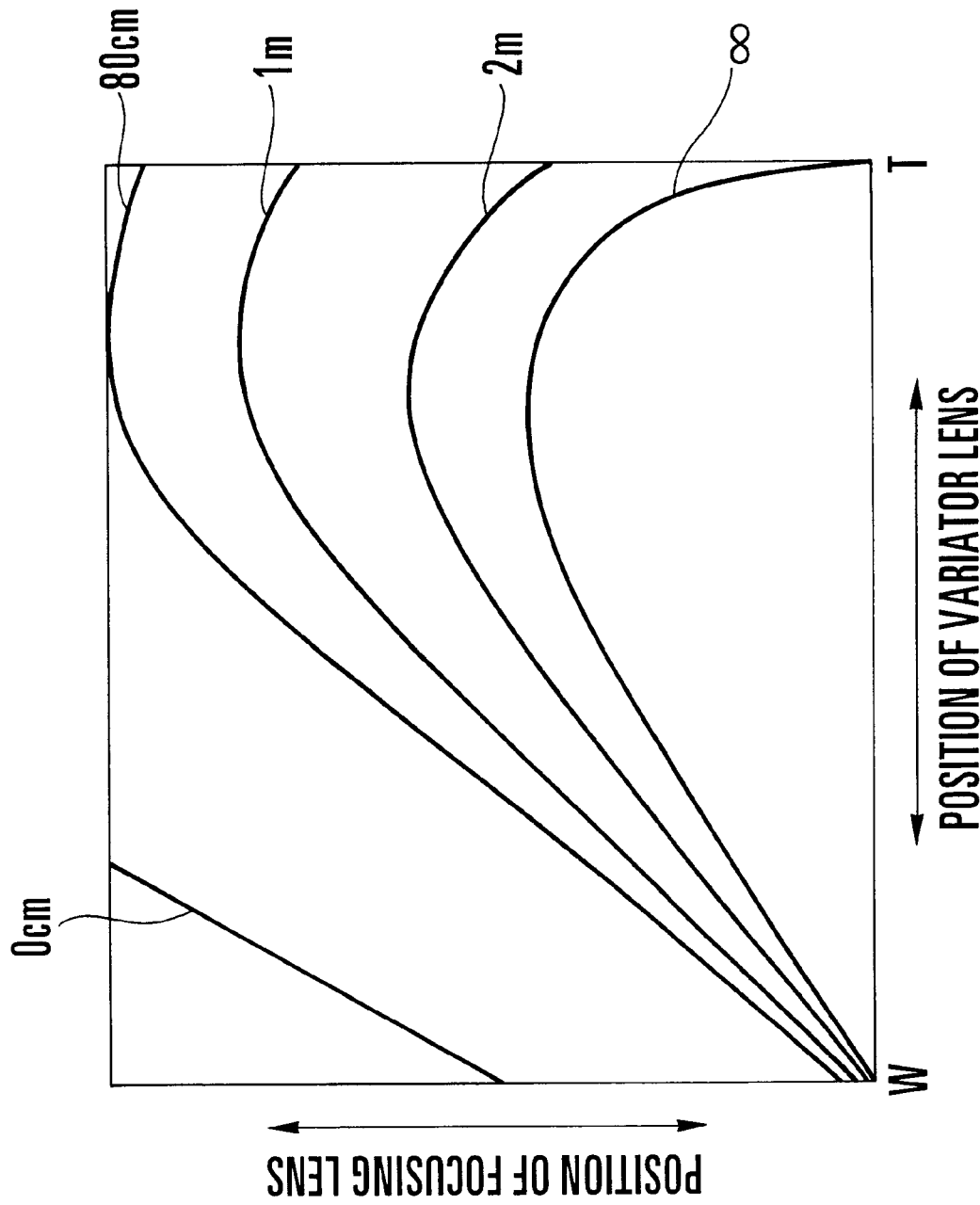
FIG. 2 is an explanatory view showing the positional relation between a focusing lens and a variator lens, which is needed for maintaining an in-focus state.
Figure 3:
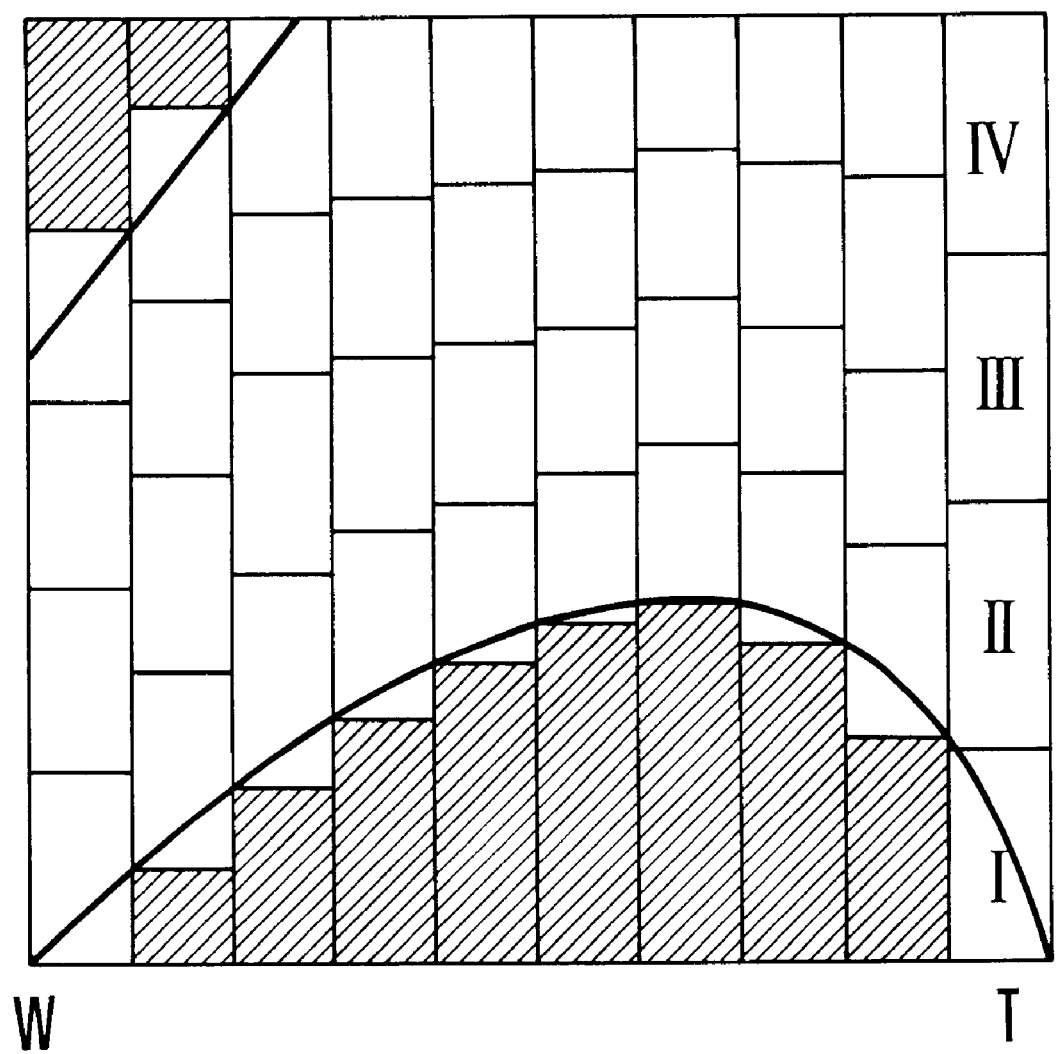
FIG. 3 is an explanatory view showing the moving speed of the focusing lens for each position of the variator lens.

In this inner focus type of zoom lens, in general, as shown in FIG. 2, its focusable subject distance ranges from 0 cm (a location immediately before the zoom lens) to infinity at its wide-angle end, and from, for example, 80 cm to infinity at its telephoto end. Accordingly, if a subject is to be brought into focus on a telephoto side, the subject needs to lie at a distance suited to the calculation of a correction value.

In addition, when the zoom lens is set to the telephoto end, the in-focus position of the focusing lens greatly differs between the closest distance, for example, 80 cm, and infinity, but when the zoom lens is set to the wide-angle end, the in-focus position of the focusing lens is approximately the same at any subject distance between 80 cm and infinity.

It follows, therefore, that if a position is detected which is finally reached by the focusing lens when a user turns off the AF device after having brought a subject into focus at the telephoto end and performs a zooming operation from the telephoto end to the wide-angle end, the difference between such position and the position of the focusing lens which can focus a subject lying at the subject distance of 80 cm to infinity may be used as a correction value.

(Eleventh Embodiment)

Figure 11:
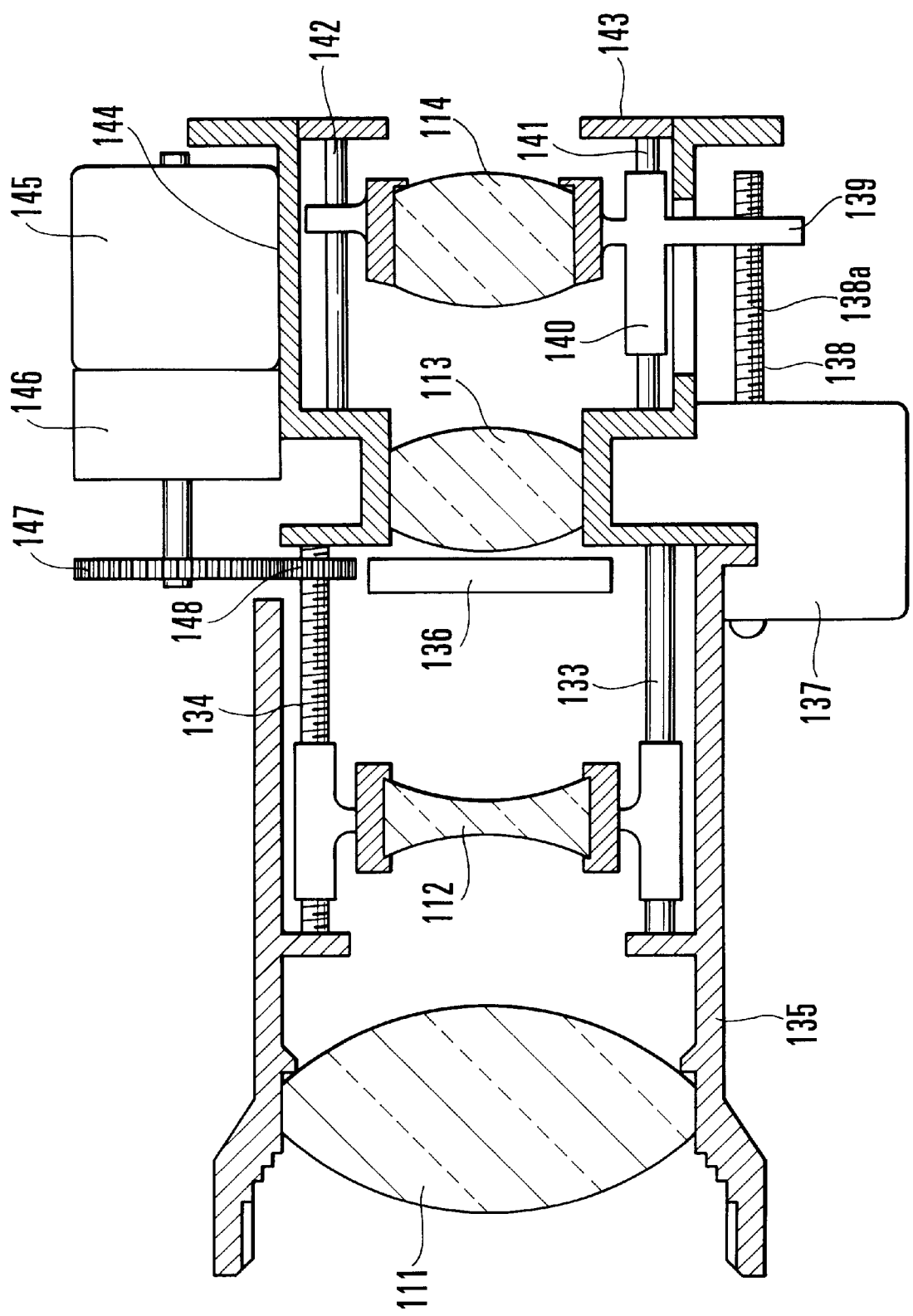
FIG. 11 is a cross-sectional view showing the construction of a zoom lens barrel.

An eleventh embodiment is suited to an optical system which includes at least four lens groups which are arranged in the order of positive refractive power, negative refractive power, positive refractive power and positive refractive power from a subject side, as shown in FIG. 11 described above. The eleventh embodiment is particularly characterized in that part or the whole of the third lens group of positive refractive power is at least made of a plastic material such as PMMA or PC.

In general, in a zoom lens for a video camera which includes glass lenses and lens barrel components essentially made of polycarbonate (PC), the main cause of a focus deviation due to a variation in environmental temperature is that the position of each of the lenses varies in the direction of the optical axis owing to an expansion or shrinkage of the lens barrel components. For example, as the position of the first lens group moves toward the subject side with a temperature rise, the position of focus relative to an in-focus subject varies toward a closer subject distance. The variation in the position of focus due to such expansion or shrinkage, although it depends on specifications, is not remarkable and, in many cases, causes no practical problems even if the present invention is not applied to the aforesaid type of zoom lens. However, in the case of a zoom lens whose lens groups are each made of a plastic material, the refractive index of the plastic material itself varies irrespective of a mechanical cause such as the expansion or shrinkage of a lens barrel, so that a far larger focus deviation is caused.

In particular, if the third lens group (113 in FIG. 11) is made of a plastic material, the difference in the amount of focus deviation between focal lengths due to a temperature variation is occasionally small. Accordingly, the eleventh embodiment of the present invention is particularly suited to an optical system in which at least the third lens group is made of a plastic material.

(Twelfth Embodiment)

A twelfth embodiment of the present invention proposes a method of detecting an environmental temperature of an apparatus including lenses whose positions are to be corrected, from the sign and the absolute value of a correction value and using the environmental temperature in the control of other functions.

In accordance with the twelfth embodiment, for example, in the case of an apparatus having a driven part using grease whose viscosity varies with temperature, a voltage or a driving waveform to be applied to an actuator which drives the driven part can be varied in a direction in which torque increases, according to the detection result of such environmental temperature.

In addition, if the environmental temperature of the apparatus is outside the range of operating environmental temperatures, execution of an actual operation may be inhibited or a warning may be issued.

Figure 26:
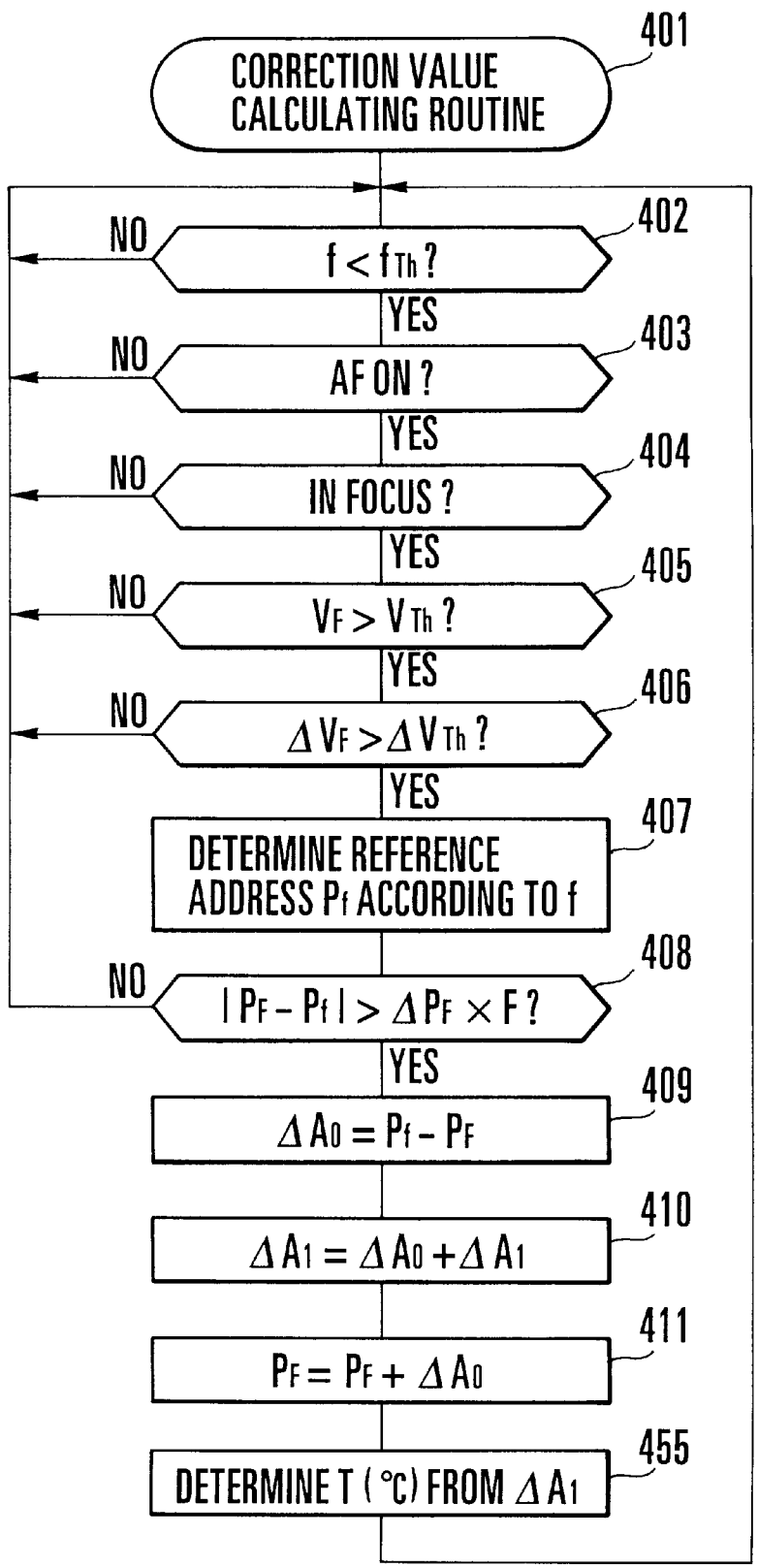
FIG. 26 is a flow chart showing the operation of a twelfth embodiment of the present invention.

FIG. 26 is a flowchart for determining an environmental temperature. The flowchart shown in FIG. 26 is similar to the flowchart, shown in FIG. 4, for determining a correction value, which flowchart constitutes a feature of the present invention. In FIG. 26, steps denoted by reference numerals identical to those used in FIG. 4 have processing contents identical to those of the corresponding steps shown in FIG. 4. The value $\Delta A_1$ calculated in Step 410 indicates a total correction value which is cumulatively obtained. In Step 455, an environmental temperature T (° C.) is inferred according to the value of total correction value $\Delta A_1$. This inference may also use a method of calculating the environmental temperature T (° C.) by a predetermined calculating expression $T = f(\Delta A_1)$ or a method of selecting the environmental temperature T (° C.) from a stored data table.

Figure 27:
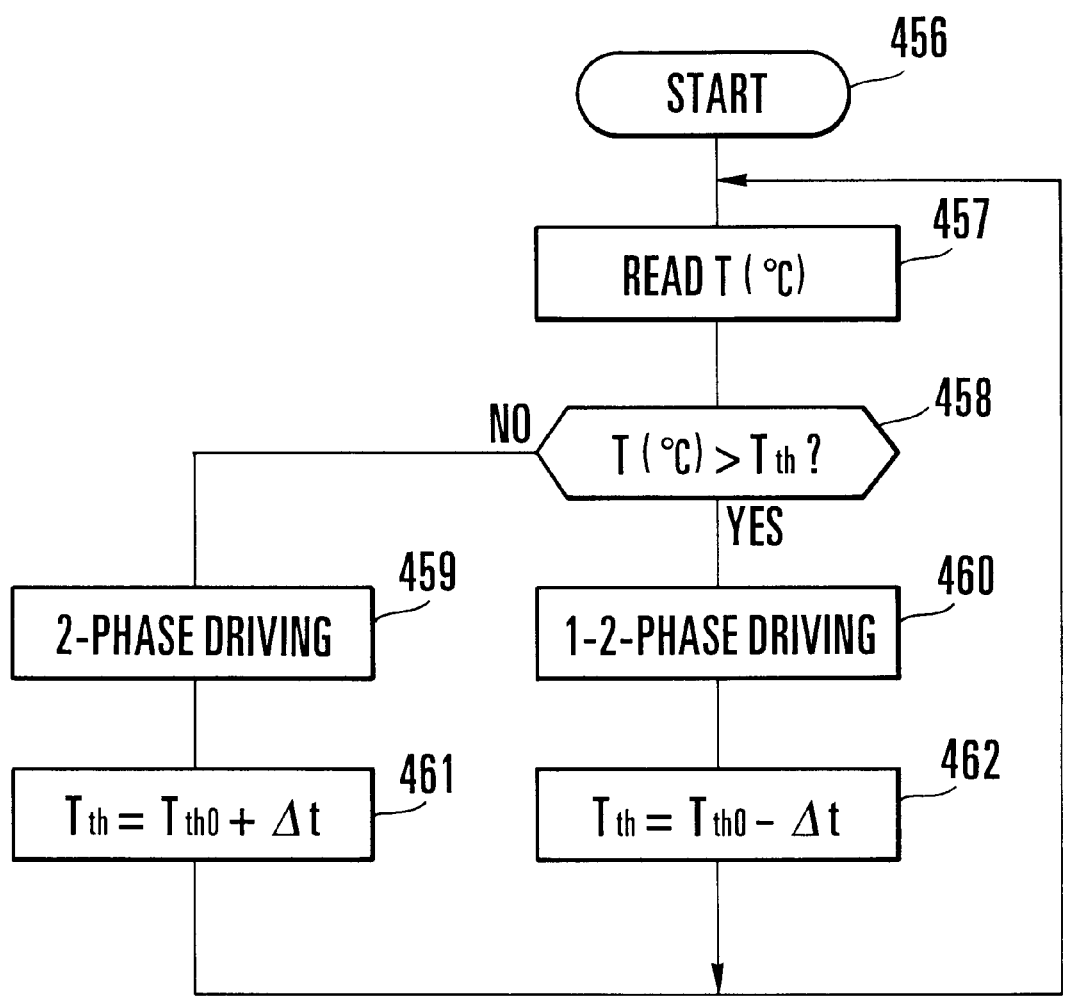
FIG. 27 is a flow chart for selecting a method of driving the stepping motor, from a detection result of an environmental temperature.

FIGS. 25 and 27 show examples of selecting a method of driving a stepping motor, from a detection result of an environmental temperature. FIG. 25 is a graph showing a so-called T-N characteristic, and the horizontal axis represents the speed of rotation of the stepping motor, whereas the vertical axis represents the output torque of the stepping motor. 1–2-phase driving or 2-phase driving is generally known as a method of driving the stepping motor. In the case of 1–2-phase driving, the phase of rotation of a rotor per step change can be reduced to half that available in 2-phase driving, so that it is possible to realize smooth rotation which does not produce a large vibration. For this reason, 1–2-phase driving is often used under operating conditions which require low-noise operations, such as focusing motors and zooming motors for zoom lenses of video cameras. However, if a slide friction on a side driven by such a motor increases under low-humidity conditions, an out-of-step operation may occur due to 1–2-phase driving itself. Contrarily, if torque settings for avoiding a low-temperature out-of-step operation are made, a noise problem may occur under normal-temperature or high-humidity conditions. 2-phase driving is capable of producing higher torque than 1–2-phase driving, but is disadvantageous in noise characteristics. In FIG. 25, a curve 463 represents a T-N characteristic obtainable during 2-phase driving, while a curve 464 represents a T-N characteristic obtainable during 1–2-phase driving.

As is apparent from the above description, it is preferable to adopt a method of, below a particular temperature in a low-temperature range, driving the stepping motor by 2-phase driving for the purpose of avoiding an out-of-step operation, and, above the particular temperature, driving the stepping motor by 1–2-phase driving for the purpose of reducing noise. It is also preferable to adopt a method of setting a temperature threshold in a temperature range within a 1–2-phase driving range so as to limit the amount of current flowing through the stepping motor.

FIG. 27 is a flowchart showing one example of such a switching operation. If the process is started in Step 456, the process proceeds to Step 457, in which the environmental temperature T obtained in Step 455 of FIG. 26 is read in. In Step 458, it is determined whether the environmental temperature T is higher than a threshold $T_{th}$. If the environmental temperature T is higher than a threshold $T_{th}$, the process proceeds to Step 460, in which a 1–2-phase driving method is selected. If the environmental temperature T is lower than the threshold $T_{th}$, the process proceeds to Step 459, in which a 2-phase driving method is selected. In either of Steps 461 or 462, hysteresis is given to the threshold $T_{th}$ to prevent the driving methods from being frequently switched therebetween at a temperature near a switching point.

Incidentally, the above description has referred to an example in which a plurality of methods of driving a stepping motor such as a zooming or focusing stepping motor for a zoom lens are changed over according to a temperature approximated from a focus-position correction value, but the twelfth embodiment can be applied to any other portion such as a film winding motor of a camera apparatus or a driving motor for an electrically-powered panhead on which this camera apparatus is mounted.

(Thirteenth Embodiment)

In a thirteenth embodiment, instead of updating the correction value $\Delta A_0$ only once each time the flowchart shown in FIG. 4 is executed, a plurality of correction values $\Delta A_0$ are stored and one correction value $\Delta A_0$ is selected from among the plurality of correction values $\Delta A_0$ as an updated correction value.

In general, in the art of modifying a focus-position absolute address improved by carrying out the present invention, it is common to consider that a variation speed of a focus position due to a variation in an environmental temperature or the like does not occur at a high speed which exceeds the depth of field on second-by-second basis. For example, the basic periods of many video cameras are 1/60 sec which is the field period of the NTSC television system standardized in Japan and the like. In such a video camera, even if, for example, the correction process shown in FIG. 4 is performed sixty times in one second, a visible focus movement does not occur in each of the correction processes.

Accordingly, it is preferable to adopt a method of cumulating and averaging the correction values obtained during photography of one scene from the moment when the video camera is set to the REC mode until the moment when the video camera is switched to the REC PAUSE mode, and updating an old correction value with the resultant correction value during the REC PAUSE mode. Otherwise, it is preferable to adopt a method of using as a correction value the minimum value of the correction values obtained during photography of one scene from the moment when the video camera is set to the REC mode until the moment when the video camera is switched to the REC PAUSE mode.

Otherwise, a timer-counter which performs, for example, one counting operation per 30 minutes may be added to the flowchart of FIG. 4 so that the number of calculations is reduced.

Otherwise, it is also preferable to adopt a method of storing a plurality of averaged values of the correction values obtained during photography of one scene (from the moment when the video camera is set to the REC mode until the moment when the video camera is switched to the REC PAUSE mode), and updating an old correction value with an averaged or minimum value of the stored averaged values. This method can, of course, be executed without a temporal problem.

(Fourteenth Embodiment)

A fourteenth embodiment modifies a correction value on the basis of an aperture value obtainable at the time of calculation of the correction value. Specifically, address correction is performed so that an in-focus address becomes a predetermined address, the in-focus address being indicative of the absolute position of a focusing lens which is in an in-focus state obtained by means of an automatic focus adjustment device or from a visual judgement of a photographer for a predetermined focal length and subject distance. In this case, if an iris is fully open, as the depth of field becomes narrower, the capability to detect the address of the focusing lens which is in focus becomes higher, but if the aperture of the iris is reduced to a small diameter, a similar in-focus signal will appear for any address of the in-focus address of the focusing lens and its neighboring addresses, so that the accuracy of detection is not high. To cope with this problem, the fourteenth embodiment provides the following methods.

(i) A correction value obtained for an aperture value smaller than a predetermined aperture value is not used.

(ii) Before a focusing lens reaches a predetermined focusing-lens position for obtaining a correction value, it is determined whether the focusing lens is in front focus or rear focus, and the result of this decision is stored. If the focusing lens is in front focus, it is determined that the position of the focusing lens lies at the front-focus-side end of a depth of field, and the focusing lens is moved from the predetermined focusing-lens position to a position by one half of the depth of field. If a lowering of the level of an AF signal is not observed even when the focusing lens reaches that position, the position is determined as a focusing-lens position from which to finally obtain a correction value.

In accordance with the above-described embodiments, since it is possible to correct a deviation of detection of a lens position due to a temperature or a humidity, it is possible to perform accurate control of the lens position.

In accordance with the above-described embodiments, it is possible to correct even residual uncorrected components, such as a dispersion of the output gain of detecting means, which may become a problem to the operation of correcting a deviation of detection of a lens position through only the detection of a temperature or a humidity, whereby it is possible to correct such deviation with high accuracy.

In accordance with the above-described embodiments, it is possible to easily perform detection of a lens position.

In accordance with the above-described embodiments, since it is determined whether a focus deviation has occurred, when the first lens is located at or near a wide-angle end for which a variation in the position of the second lens for focus adjustment is small with respect to a variation in a subject distance, the focus deviation can be detected easily and accurately.

Furthermore, in accordance with the above-described embodiments, it is possible to prevent an erroneous correction from occurring in the case of an inappropriate ultra-close subject distance.

Furthermore, in accordance with the above-described embodiments, it is possible to allow correction of a focus deviation to be performed according to the will of a photographer.

Furthermore, in accordance with the above-described embodiments, it is possible to clear the correction of a focus deviation correction and prevent an erroneous correction from occurring when an apparatus is moved from one environment to a different environment.

Furthermore, in accordance with the above-described embodiments, it is possible to accurately correct a focus deviation even in the case of a plastic lens whose focus position greatly varies with a variation in, particularly, temperature or humidity.

Furthermore, in accordance with the above-described embodiments, it is possible to prevent an erroneous correction due to an abnormal value, by averaging a plurality of correction values or selecting a minimum value therefrom.

Furthermore, in accordance with the above-described embodiments, it is possible to prevent an erroneous correction from occurring in the case of an inappropriate ultra-close subject distance or an inappropriate subject.

What is claimed is:

1. A lens device comprising:
   an optical system including a first lens which performs a magnification varying operation, and a second lens which is positioned rearwardly of said first lens along an optical axis and performs a focus adjusting operation;
   first detecting means for detecting a position of said first lens and a position of said second lens; and
   a storage circuit which stores a positional relation between said first lens and said second lens, with said first lens being set at a predetermined position, wherein a position detection by said first detecting means is corrected by use of deviation information if the position of said lens and the position of said second lens is detected by said first detecting means deviate from the positional relation stored in said storage circuit, when an in-focus state of said second lens is detected.

2. A device according to claim 1, wherein detection of the position of at least either one of said first lens and said second lens is performed on the basis of an amount of movement of said at least either one from a reset position, said first detecting means including a reset position detecting mechanism.

3. A device according to claim 1, wherein said storage circuit has at least stored information which stores a position to be occupied by said second lens when at least said first lens is positioned at or near a wide-angle end, the position detection by said first detecting means being corrected by use of the stored information and information indicative of an actual deviation of the position of said second lens.

4. A device according to claim 1, wherein said optical system is capable of being switched between a normal photography range and a macrophotography range, correction of the position detection by said first detecting means being disabled when said optical system is set to the macrophotography range.

5. A device according to claim 1, further comprising:
operating switch means which can be externally operated, wherein only when said operating switch means performs a particular operation, correction of the position detection by said first detecting means is executed.

6. A device according to claim 1, wherein correction of the position detection by said first detecting means is cancelled when a power source is turned off.

7. A device according to claim 1, wherein correction of the position detection by said first detecting means is cancelled when a power source is turned off.

8. A device according to claim 1, wherein said optical system uses a plastic lens.

9. A device according to claim 3, wherein said optical system uses a plastic lens.

10. A device according to claim 1, wherein the position detection by said first detecting means is corrected with a particular correction value selected from a plurality of correction values.

11. A lens device comprising:
an optical system including a first lens which performs a magnification varying operation, and a second lens which is positioned rearwardly of said first lens along an optical axis and performs a focus adjusting operation;
first detecting means for detecting a position of said first lens and a position of said second lens;
second detecting means for detecting an environmental state such as temperature or humidity; and
a storage circuit which stores a positional relation between said first lens and said second lens, with said first lens being set at a predetermined position, wherein a position detection by said first detecting means is corrected by use of deviation information and a detection result of said second detecting means if the position of said first lens and the position of said second lens detected by said first detecting means deviate from the positional relation stored in said storage circuit, when an in-focus state of said second lens is detected.

12. A device according to claim 11, wherein detection of the position of at least either one of said first lens and said second lens is performed on the basis of an amount of movement of said at least either one from a reset position, said first detecting means including a reset position detecting mechanism.

13. A device according to claim 11, wherein said storage circuit has at least stored information which stores a position to be occupied by said second lens when at least said first lens is positioned at or near a wide-angle end, the position detection by said first detecting means being corrected by use of the stored information and information indicative of an actual deviation of the position of said second lens.

14. A device according to claim 11, wherein said optical system is capable of being switched between a normal photography range and a macrophotography range, correction of the position detection by said first detecting means being disabled when said optical system is set to the macrophotography range.

15. A device according to claim 11, further comprising:
operating switch means which can be externally operated, wherein only when said operating switch means performs a particular operation, correction of the position detection by said first detecting means is executed.

16. A device according to claim 11, wherein said optical system uses a plastic lens.

17. A device according to claim 13, wherein said optical system uses a plastic lens.

18. A device according to claim 11, wherein the position detection by said first detecting means is corrected with a particular correction value selected from a plurality of correction values.

19. An optical apparatus comprising:
an optical system including a first lens which performs a magnification varying operation, and a second lens which is positioned rearwardly of said first lens along an optical axis and performs a focus adjusting operation;
first detecting means for detecting a position of said first lens and a position of said second lens;
focus detecting means for detecting a state of focus; and
a storage circuit which stores a positional relation between said first lens and said second lens, with said first lens being set at a predetermined position, wherein a position detection by said first detecting means is corrected by use of deviation information if the position of said first lens and the position of said second lens detected by said first detecting means deviate from the positional relation stored in said storage circuit, when an in-focus state of said second lens is detected by said focus detecting means.

20. An apparatus according to claim 19, wherein detection of the position of at least either one of said first lens and said second lens is performed on the basis of an amount of movement of said at least either one from a reset position, said first detecting means including a reset position detecting mechanism.

21. An apparatus according to claim 19, wherein said storage circuit has at least stored information which stores a position to be occupied by said second lens when at least said first lens is positioned at or near a wide-angle end, the position detection by said first detecting means being corrected by use of the stored information and information indicative of an actual deviation of the position of said second lens.

22. An apparatus according to claim 19, wherein said optical system is capable of being switched between a normal photography range and a macrophotography range, correction of the position detection by said first detecting means being disabled when said optical system is set to the macrophotography range.

23. An apparatus according to claim 19, further comprising:
operating switch means which can be externally operated, wherein only when said operating switch means performs a particular operation, correction of the position detection by said first detecting means is executed.

24. An apparatus according to claim 19, wherein correction of the position detection by said first detecting means is cancelled when a power source is turned off.

25. An apparatus according to claim 19, wherein said optical system uses a plastic lens.

26. An apparatus according to claim 21, wherein said optical system uses a plastic lens.

27. An apparatus according to claim 19, wherein the position detection by said first detecting means is corrected with a particular correction value selected from a plurality of correction values.

28. An optical apparatus comprising:
an optical system including a first lens which performs a magnification varying operation, and a second lens which is positioned rearwardly of said first lens along an optical axis and performs a focus adjusting operation;

first detecting means for detecting a position of said first lens and a position of said second lens;

second detecting means for detecting an environmental state such as temperature or humidity;

focus detecting means for detecting means for detecting a state of focus; and a storage circuit which stores a positional relation between said first lens and said second lens, with said first lens being set at a predetermined position, wherein a position detection by said first detecting means is corrected by use of deviation information and a detection result of said second detecting means if the position of said first lens and the position of said second lens detected by said first detecting means deviate from the positional relation stored in said storage circuit, when an in-focus state of said second lens is detected by said focus detecting means.

29. An apparatus according to claim 28, wherein detection of the position of at least either one of said first lens and said second lens is performed on the basis of an amount of movement of said at least either one from a reset position, said first detecting means including a reset position detecting mechanism.

30. An apparatus according to claim 28, wherein said storage circuit has at least stored information which stores a position to be occupied by said second lens when at least said first lens is positioned at or near a wide-angle end, the position detection by said first detecting means being corrected by use of the stored information and information indicative of an actual deviation of the position of said second lens.

31. An apparatus according to claim 28, wherein said optical system is capable of being switched between a normal photography range and a macrophotography range, correction of the position detection by said first detecting means being disabled when said optical system is set to the macrophotography range.

32. An apparatus according to claim 28, further comprising:

operating switch means which can be externally operated, wherein only when said operating switch means performs a particular operation, correction of the position detection by said first detecting means is executed.

33. An apparatus according to claim 28, wherein correction of the position detection by said first detecting means is cancelled when a power source is turned off.

34. An apparatus according to claim 28, wherein said optical system uses a plastic lens.

35. An apparatus according to claim 30, wherein said optical system uses a plastic lens.

36. An apparatus according to claim 28, wherein the position detection by said first detecting means is corrected with a particular correction value selected from a plurality of correction values.

* * * * *

UNITED STATES PATENT AND TRADEMARK OFFICE
CERTIFICATE OF CORRECTION

PATENT NO. : 6,115,552  
DATED : September 5, 2000  
INVENTOR(S) : Naoya Kaneda

Page 1 of 1

It is certified that error appears in the above-identified patent and that said Letters Patent is hereby corrected as shown below:

Column 1,
Line 46, delete "FIG. 11," and insert -- FIG. 11), --.

Column 4,
Line 57, delete "becomes is equal" and insert -- becomes equal --.

Column 8,
Line 8, delete "correct focus" and insert -- correcting focus --.

Column 11,
Line 17, delete "systems in account" and insert -- systems into account --.

Column 14,
Line 38, delete "B=20" and insert -- D=20 --.

Column 15,
Line 33, delete "negligeable" and insert -- negligible --.

Column 17,
Line 66, delete "an correction" and insert -- a correction --.

Signed and Sealed this

Eighteenth Day of December, 2001

*Attest:*

JAMES E. ROGAN
*Attesting Officer*     *Director of the United States Patent and Trademark Office*